(12) United States Patent
Oami

(10) Patent No.: US 11,875,518 B2
(45) Date of Patent: Jan. 16, 2024

(54) OBJECT FEATURE EXTRACTION DEVICE, OBJECT FEATURE EXTRACTION METHOD, AND NON-TRANSITORY COMPUTER-READABLE MEDIUM

(71) Applicant: NEC Corporation, Tokyo (JP)

(72) Inventor: Ryoma Oami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 170 days.

(21) Appl. No.: 17/604,809

(22) PCT Filed: Apr. 25, 2019

(86) PCT No.: PCT/JP2019/017572
§ 371 (c)(1),
(2) Date: Oct. 19, 2021

(87) PCT Pub. No.: WO2020/217369
PCT Pub. Date: Oct. 29, 2020

(65) Prior Publication Data
US 2022/0180533 A1 Jun. 9, 2022

(51) Int. Cl.
*G06T 7/246* (2017.01)
*G06T 7/73* (2017.01)
*G06T 7/00* (2017.01)

(52) U.S. Cl.
CPC ............ *G06T 7/246* (2017.01); *G06T 7/0002* (2013.01); *G06T 7/73* (2017.01);
(Continued)

(58) Field of Classification Search
CPC ......... G06T 7/246; G06T 7/0002; G06T 7/73; G06T 2207/10016; G06T 2207/30168; G06T 2207/30196
See application file for complete search history.

(56) References Cited

U.S. PATENT DOCUMENTS

2015/0227806 A1  8/2015 Oami
2018/0197000 A1  7/2018 Ogura et al.
(Continued)

FOREIGN PATENT DOCUMENTS

JP  2010-072723 A  4/2010
JP  2015-103103 A  6/2015
(Continued)

OTHER PUBLICATIONS

International Search Report for PCT Application No. PCT/JP2019/017572, dated Jul. 9, 2019.

*Primary Examiner* — Amara Abdi
(74) *Attorney, Agent, or Firm* — Sughrue Mion, PLLC

(57) ABSTRACT

According to an example embodiment, an object feature extraction device includes a video acquisition means for acquiring a video and generating the acquired video as an image sequence, an object detection means for detecting an object from the generated image and generating a detection result, an object tracking means for tracking the object based on the generated image and the detection result and generating a tracking result, an image storage means for storing the image, a detection result storage means for storing the detection result, a tracking result storage means for storing the tracking result, an object selection means for calculating, based on the detection result and the tracking result, a quality index for predicting the quality of a feature of the object detected at an extraction time, selecting the object to be subjected to feature extraction, and generating object selection information.

17 Claims, 26 Drawing Sheets

(52) U.S. Cl.
CPC .............. *G06T 2207/10016* (2013.01); *G06T 2207/30168* (2013.01); *G06T 2207/30196* (2013.01)

(56) References Cited

U.S. PATENT DOCUMENTS

| | | | |
|---|---|---|---|
| 2020/0034649 A1 | 1/2020 | Oami | |
| 2020/0074612 A1* | 3/2020 | Iwamatsu | G06V 40/167 |
| 2021/0192185 A1* | 6/2021 | Lin | G06V 40/167 |
| 2021/0398265 A1* | 12/2021 | Baijal | G06F 18/214 |

FOREIGN PATENT DOCUMENTS

| | | | | |
|---|---|---|---|---|
| JP | 2020-144493 | * | 9/2020 | .............. Y02P 90/30 |
| WO | 2014/045479 A1 | | 3/2014 | |
| WO | 2017/006749 A1 | | 1/2017 | |
| WO | 2018/173848 A1 | | 9/2018 | |

* cited by examiner

OBJECT FEATURE EXTRACTION DEVICE, OBJECT FEATURE EXTRACTION METHOD, AND NON-TRANSITORY COMPUTER-READABLE MEDIUM

This application is a National Stage Entry of PCT/JP2019/017572 filed on Apr. 25, 2019, the contents of all of which are incorporated herein by reference, in their entirety.

TECHNICAL FIELD

The present invention relates to an object feature extraction device, an object feature extraction method, and a non-transitory computer-readable medium that detect an object from a video acquired by an imaging device and extract a feature of the object.

BACKGROUND ART

There has been proposed a method for detecting an object or a person (hereinafter, referred to as an object) with a camera to extract a feature. The feature is used to match objects detected by different cameras or to search for the same or a similar object from videos having been captured and stored.

Various values are used as the feature, but features extracted based on deep learning have been used recently as the technique of deep learning progresses. Features extracted based on deep learning contribute to matching with high accuracy, but take time for extraction processing in many cases. Thus, if there are a large number of objects as feature extraction targets simultaneously appearing on an image, the time for feature extraction cannot be ignored. In particular, if the processing is performed on each frame of a video while the calculation resource is severely restricted, it is difficult to perform the processing in real time.

In view of the above, instead of extracting features from all the objects appearing on the image, a method in which objects to be subjected to feature extraction are selected and the features are extracted only from the selected objects has been proposed. For example, Patent Literature 1 discloses a method for extracting a feature of a person and that it is determined, based on the size of the person on the image and the past feature extraction frequency, which person is to be subjected to feature extraction by prioritizing the persons detected on the image depending on the size. In addition, by providing a comprehensive selection means for selecting a person whose feature is to be extracted by a random number, a method for alternately performing priority processing and comprehensive processing to select a person and extracting the feature is disclosed. In addition, it is also disclosed that orientation may be considered in selecting the person whose feature is to be extracted.

In addition, Patent Literature 2 discloses a method of increasing the frequency of feature extraction of a person in the lower region of the image because, in the case of installing a normal surveillance camera that captures images from diagonally above, the lower part of the image is closer to the camera and the motion of a person on the image becomes large although the person largely appears. It is also disclosed that the frequency of feature extraction is increased for a person whose motion is large in consideration of the magnitude of the movement of a person.

CITATION LIST

Patent Literature

Patent Literature 1: International Patent Publication No. WO 2017/006749
Patent Literature 2: International Patent Publication No. WO 2014/045479

SUMMARY OF INVENTION

Technical Problem

However, the method disclosed in Patent Literature 1 considers only the size of a person and does not consider the possibility of a motion blur when the person moves although the size is large, and can possibly extract features that are not suitable for matching. Furthermore, other factors that deteriorate features are not considered.

On the other hand, in Patent Literature 2, since a person is not tracked, no history information indicating how much the features have been extracted for each person in the past is held, and the number of feature extractions can be possibly greatly different among individual persons.

In addition, neither Patent Literature 1 nor Patent Literature 2 consider overlapping of persons and occlusion by other obstacles, and features suitable for matching cannot be always extracted from selected persons. Furthermore, factors that deteriorate features, such as a blur and illumination conditions, other than the size are not considered either.

A purpose of the present invention is, in view of the above problem, to provide an object feature extraction device, an object feature extraction method, and a non-transitory computer-readable medium that adaptively select an objects to be subjected to feature extraction in each frame of a video even if a feature requires time for feature extraction and that enable highly-accurate matching of the object as a whole.

Solution to Problem

An object feature extraction device according to an example embodiment includes a video acquisition means for acquiring a video and generating the acquired video as an image sequence, an object detection means for detecting an object from the generated image and generating a detection result, an object tracking means for tracking the object based on the generated image and the detection result and generating a tracking result, an image storage means for storing the image, a detection result storage means for storing the detection result;

a tracking result storage means for storing the tracking result, an object selection means for calculating, based on the detection result stored in the detection result storage means and the tracking result stored in the tracking result storage means, a quality index for predicting quality of a feature of the object detected at an extraction time, the extraction time being one or more frames before a current time, selecting, based on the quality index, the object to be subjected to feature extraction at the extraction time, and generating object selection information, and an object feature extraction means for extracting, based on the image at the extraction time stored in the image storage means, the detection result at the extraction time stored in the detection result storage means, and the object selection information, the feature of the object detected from a frame at the extraction time.

In addition, an object feature extraction method according to an example embodiment includes the steps of acquiring a video and generating the acquire video as an image sequence, detecting an object from the generated image and generating a detection result, tracking the object based on the generated image and the detection result and generating a tracking result, storing the image in an image storage means, storing the detection result in a detection result storage means, storing the tracking result in a tracking result storage means, calculating, based on the detection result stored in the detection result storage means and the tracking result stored in the tracking result storage means, a quality index for predicting quality of a feature of the object detected at an extraction time, the extraction time being one or more frames before a current time, selecting, based on the quality index, the object to be subjected to feature extraction at the extraction time, and generating object selection information, and extracting, based on the image at the extraction time stored in the image storage means, the detection result at the extraction time stored in the detection result storage means, and the object selection information, the feature of the object detected from a frame at the extraction time.

In addition, a program according to an example embodiment causes a computer to execute acquiring a video and generating the acquire video as an image sequence, detecting an object from the generated image and generating a detection result, tracking the object based on the generated image and the detection result and generating a tracking result, storing the image in an image storage means, storing the detection result in a detection result storage means, storing the tracking result in a tracking result storage means, calculating, based on the detection result stored in the detection result storage means and the tracking result stored in the tracking result storage means, a quality index for predicting quality of a feature of the object detected at an extraction time, the extraction time being one or more frames before a current time, selecting, based on the quality index, the object to be subjected to feature extraction at the extraction time, and generating object selection information, and extracting, based on the image at the extraction time stored in the image storage means, the detection result at the extraction time stored in the detection result storage means, and the object selection information, the feature of the object detected from a frame at the extraction time.

Advantageous Effects of Invention

According to an example embodiment, it is possible to extract a feature suitable for matching evenly from all the objects without being biased to certain objects, and an object feature extraction device, an object feature extraction method, and a non-transitory computer-readable medium that enable highly-accurate matching are provided.

DESCRIPTION OF EMBODIMENTS

Figure 1:
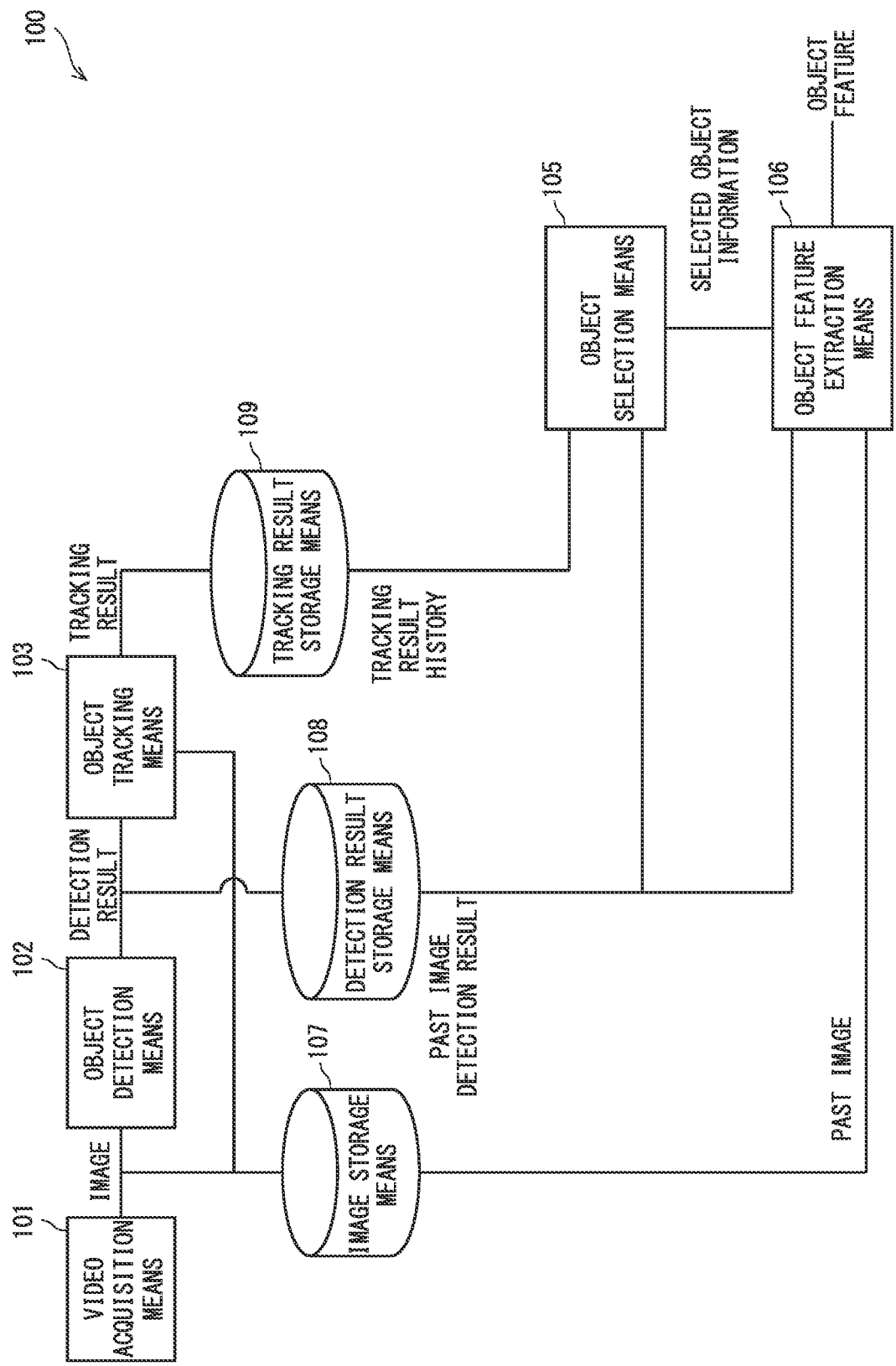
FIG. 1 is a block diagram exemplifying a configuration of an object feature extraction device according to a first example embodiment.

Next, the best mode for carrying out the present invention will be described in detail with reference to the drawings.
(First Example Embodiment)
FIG. 1 is a block diagram exemplifying a configuration of an object feature extraction device according to a first example embodiment. As shown in FIG. 1, an object feature extraction device 100 includes a video acquisition means 101, an object detection means 102, an object tracking means 103, an object selection means 105, an object feature extraction means 106, an image storage means 107, a detection result storage means 108, and a tracking result storage means 109.

The video acquisition means 101 acquires a video and outputs the acquired video to the object detection means 102, the object tracking means 103, and the image storage means 107.

The object detection means 102 performs object detection on an image output from the video acquisition means 101 and outputs an object detection result to the object tracking means 103 and the detection result storage means 108.

The object tracking means 103 performs, based on the object detection result output from the object detection means 102, object tracking processing using the image output from the video acquisition means 101 and outputs an object tracking result to the tracking result storage means 109.

The object selection means 105 selects, based on the past image tracking result output from the detection result storage means 108 and the tracking result history information output from the tracking result storage means 109, an object to be subjected to feature extraction and outputs selected object information to the object feature extraction means 106.

The object feature extraction means 106 extracts, from the image output from the image storage means 107 based on the object detection result output from the detection result storage means 108, a feature of the object included in the selected object information output from the object selection means 105.

Next, the operation of the object feature extraction device 100 in FIG. 1 is described. The video acquisition means 101 captures a video of an area or object to be monitored. Here, the video acquisition means may be any means capable of capturing a video. For example, the video acquisition means may be a fixed surveillance camera or a Web camera or may be a camera mounted on a moving body, such as an UAV or a vehicle. Alternatively, the video acquisition means may be a body-worn camera worn by a police officer or a guard, or may be a video camera held by a user. The video captured by the video acquisition means 101 is output as an image sequence. This image sequence is output to the object detection means 102 and the object tracking means 103 and is also output to the image storage means 107 in order to be stored.

The object detection means 102 performs object detection on the image input from the video acquisition means 101 and outputs the result as an object detection result. If the object is a person, a person region is detected using a detector that has learnt image features of a person. For example, a detector that performs detection using Histograms of Oriented Gradients (HOG) features or a detector that performs detection directly from an image using Convolutional Neural Network (CNN) may be used.

Alternatively, a person may be detected using a detector that has learnt not a whole person but a partial region of a person (for example, a head or the like). For example, if a head position and a foot position are detected by a detector that has learnt heads and feet, a person region can be specified. In addition, a person region may be detected by, for example, combining silhouette information obtained from background differences (information regarding a region having a difference from a background model) and head detection information.

If the object is a vehicle, the vehicle can be similarly detected using a detector that has learnt image features of a vehicle. If the object is a certain object other than those, a detector that has learnt image features of the certain object may be configured and used.

Then, information about the detected object is collected and is generated as object detection result information. Here, the object detection result information includes time information about a frame in which detection is performed (or information for identifying the frame such as a frame number) and information about the detected object, and the information about the object includes the detection position and the size of the object.

Here, the position of the object may be represented by the position on an image or may be converted into real-world coordinates to represent the position using parameters representing the position and pose of the camera obtained by calibration of the camera. For example, to represent the position of the object by the position on the image, the coordinates of the vertices (for example, the upper left and lower right vertices) of the rectangle surrounding the object may be used.

Alternatively, the position of the object may be represented by the information about one vertex and the width and height of the rectangle. If a plurality of objects is detected, the object detection result information includes information about the plurality of detected objects. The object detection result information further includes ID information for distinguishing the detected objects in the same frame. However, this ID information is allocated to distinguish a plurality of objects detected in the same frame and is different from ID information allocated to a tracking target object. The generated object detection result information is output to the object tracking means 103 and is also output to the detection result storage means 108 in order to be stored.

The object tracking means 103 performs, based on the detection result, tracking processing called Tracking by Detection. That is, the object tracking means 103 determines that each object as a tracking target included in the object tracking result until the previous time is associate with which detected object included in the object detection result at the current time, and updates the tracking result.

At this time, the position of each object as a tracking target may be predicted by a Kalman filter or a particle filter, and then associated with the detected object at the current time. When a tracking target object has been associated with a detected object, the information about the tracking target object is updated with the information about the corresponding detected object and the image at that time.

On the other hand, when a detected object has not been associated with any tracking target object, the detected object is highly likely to be an object that has newly appeared, and a tracking target object associated with the detected object is newly generated and added to the object tracking result. On the contrary, when there is a tracking target object that has not been associated with any detected object, the tracking target object is considered to disappear due to some reason that, for example, the tracking target object has moved out of the image. Thus, processing for erasing the tracking target object from the tracking result is performed.

However, the tracking target object is not erased when being not associated once, but may be erased when being not associated several continuous times. For this control, the likelihood representing the certainty of a tracking target object is defined in advance, and the likelihood is increased if being associated with a detected object from the time of being newly generated, or the likelihood is reduced if being not associated, and the tracking target object may be erased when the likelihood is below a certain value.

Note that, in this calculation for the likelihood, in addition to the information as to whether a tracking target object is associated with a detection result, the certainty of the association may be considered. In this manner, the object tracking result is generated at the current time and is output.

Here, object tracking result information includes the position and size of an object in an image, ID information allocated to each tracking target object, and ID information about an corresponding detected object (if there is no association, information indicating no association). Note that, the method for describing position information is arbitrary, and the position may be indicated by circumscribed-rectangular information about the tracking target object, or may be indicated by coordinates of a point obtained in a tracking object region and size information represented by relative information based on the point.

For example, in the case of representing the position on the image, the coordinates of the vertices (for example, the upper left and lower right vertices) of the rectangle surrounding the object may be used. Alternatively, information indicating one vertex and the width and height of the rectangle may be used. Alternatively, conversion into real-space coordinates may be performed and output. The generated object tracking result information is output to and stored in the tracking result storage means 109.

The image storage means 107 stores images acquired by the video acquisition means 101 until a certain time before the current time (referred to as $T_{cur}$). Since object feature extraction described later is performed on an image at a time slightly before the current time, images for the time including at least that time are stored. Then, when read from the object feature extraction means 106 described later, the image at a specified time is output.

The detection result storage means 108 stores object detection results until a certain time before the current time $T_{cur}$. The object detection results are required to be stored only for the same time period as the images stored in the image storage means 107. Then, when read from the object selection means 105 or the object feature extraction means 106 described later, the detection result at a specified time is output.

The tracking result storage means 109 stores object tracking results. Then, when read from the object selection means 105 described later, the tracking result history at a specified time section is output.

The object selection means 105 selects an object to be subjected to feature extraction by the object feature extraction means 106 described later at a feature extraction target time. The object feature extraction means 106 performs object feature extraction on an image at a time slightly before the current time, and the object selection means 105 selects an object at that time (hereinafter, referred to as an extraction time). Assuming that the extraction time is a time $T_{cur}-\tau$ that is a time $\tau(>0)$ before the current time $T_{cur}$, the object selection means 105 reads the object detection result for the image at the extraction time $T_{cur}-\tau$ as a past detection result from the detection result storage means 108.

In addition, tracking results from a time $T_{cur}-\tau-\Delta T$ to the current time $T_{cur}$ are read from the tracking result storage means 109. Here, $\Delta T(>0)$ represents a time section necessary for estimating the state or motion of the object from the tracking result. Then, it is determined which object among tracking target objects is subjected to feature extraction processing, and selected object information for selecting the object to be subjected to the feature extraction is generated. The selected object information includes the extraction time $T_{cur}-\tau$, ID information about a tracking target object to be subjected to feature extraction, and ID information about a detected object associated with the tracking target object.

The details of the operation of the object selection means 105 will be described later. The generated selected object information is output to the object feature extraction means 106.

The object feature extraction means 106 extracts, based on the selected object information and the object detection result information at the extraction time $T_{cur}-\tau$, an object feature from the image at the extraction time $T_{cur}-\tau$. That is, with the detected object ID associated with the tracking object ID included in the selected object information, position information about the detected object is obtained from the object detection result information, and the feature of the corresponding image region is extracted as the feature of the object having the tracking object ID.

The feature to be extracted is a visual feature representing the color, shape, pattern, and the like of the object, and may be any feature as long as the feature is usable for identifying the object. For example, the feature may be a histogram of a color or luminance gradient feature, a local feature such as SIFT or SURF, or a feature describing a pattern such as Gabor wavelet. Alternatively, it may be a feature for object identification obtained by deep learning.

With the above configuration, although there are a large number of objects appearing on an image, it is possible to appropriately select an object to be subjected to feature extraction, to reduce the cost for feature extraction processing, and to achieve feature extraction that enables highly-accurate matching of the object as a whole. In particular, by slightly delaying the feature extraction, it is possible to more appropriately select an object whose feature is to be extracted.

Figure 2:
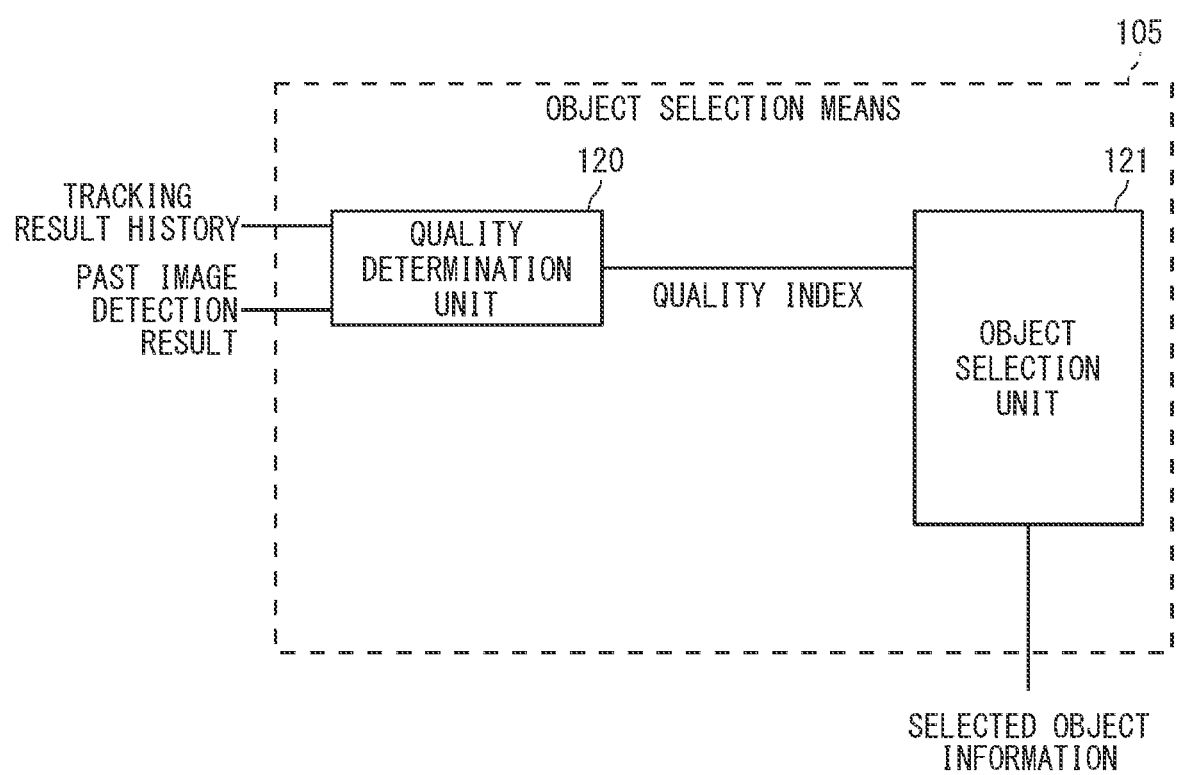
FIG. 2 is a block diagram exemplifying a configuration of an object selection means in the object feature extraction device according to the first example embodiment.

Next, the object selection means 105 in FIG. 1 is more detailedly described. FIG. 2 is a block diagram exemplifying a configuration of the object selection means in the object feature extraction device according to the first example embodiment. As shown in FIG. 2, the object selection means 105 includes a quality determination unit 120 and an object selection unit 121.

The quality determination unit 120 obtains a quality index based on an input object tracking result history and past image object detection result and outputs it to the object selection unit 121. The object selection unit 121 selects, based on the quality index output from the quality determination unit 120, an object whose feature is to be extracted and outputs it to the selected object information.

Next, the operation of the object selection means 105 is described. The past image object detection result and the object tracking result history are input to the quality determination unit 120. Here, the past image object detection result is the detection result of the object in the image at the extraction time $T_{cur}-\tau$. The object tracking result history is the tracking result of the object from the time $T_{cur}-\tau-\Delta T$ to the current time $T_{cur}$.

The quality determination unit 120 calculates, based on the input object tracking result history and past image object detection result, the quality index of each tracking target object in the image at the extraction time $T_{cur}-\tau$.

The quality index is an index for predicting the quality of the feature to be extracted before feature extraction, and is to be high when it is predicted that a high quality feature is to be extracted from the object, or is to be low otherwise.

The possible range of the quality index is arbitrary, but the quality index is assumed to take a value in the range of [0, 1] in the following.

The details of the quality determination unit 120 will be described later. The calculated quality index is associated with the ID of the tracking target object and the information about the corresponding detected object ID and output to the object selection unit 121.

The object selection unit 121 selects a tracking target object having a large input quality index value. Specifically, for example, a tracking target object having a quality index value larger than a certain value is selected. Alternatively, by sorting tracking target objects by quality index values, a certain number of tracking target objects having larger values (if the number of objects is less than the certain number, all of the tracking target objects) are selected. Alternatively, by combining both criteria, objects may be selected (for example, a certain number of objects having larger values may be selected from objects having quality index values larger than the certain value). The ID of the selected tracking target object, the ID of the corresponding detected object, and the extraction time information are combined and output as the selected object information.

Figure 3:
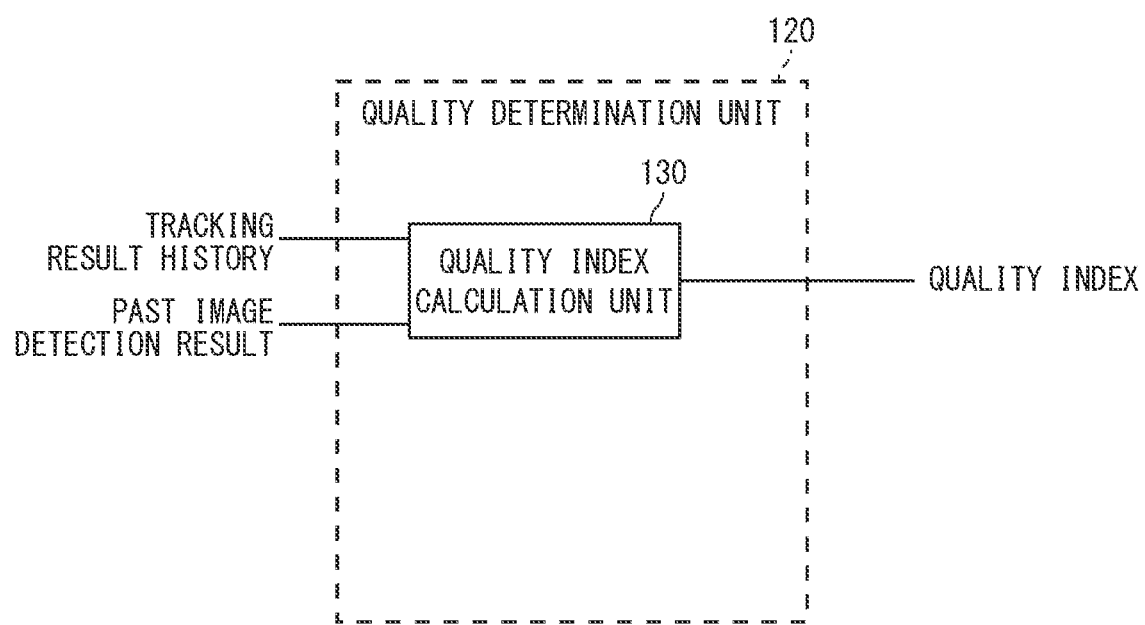
FIG. 3 is a block diagram exemplifying a quality determination unit of the object selection means in the object feature extraction device according to the first example embodiment.

Next, the details of the quality determination unit 120 in FIG. 2 will be described. FIG. 3 is a block diagram exemplifying the quality determination unit 120 of the object selection means in the feature extraction device according to the first example embodiment. As shown in FIG. 3, the quality determination unit 120 includes a quality index calculation unit 130. The quality index calculation unit 130 calculates a quality index based on the past image object detection result and the object tracking result history, and outputs it.

Next, the operation of the quality determination unit 120 in FIG. 3 is described. The quality index calculation unit 130 calculates, for various factors, a quality index of each tracking target object included in the tracking result at the extraction time $T_{cur}-\tau$ in the object tracking result history. The larger the size of a detected object, more detail feature of the object can be extracted. Thus, it is generally considered that as the size (resolution) of an object is larger, the quality of the feature is increased. Accordingly, using a size S of the object region (for example, the area of the region, the width or height of the region, or the like) obtained from the object detection result, the value of a quality index $q_{Res}$ based on the resolution can be obtained by Expression (1).

[Expression 1]

$$q_{Res}=f_{Res}(S) \quad (1)$$

Figure 17A:
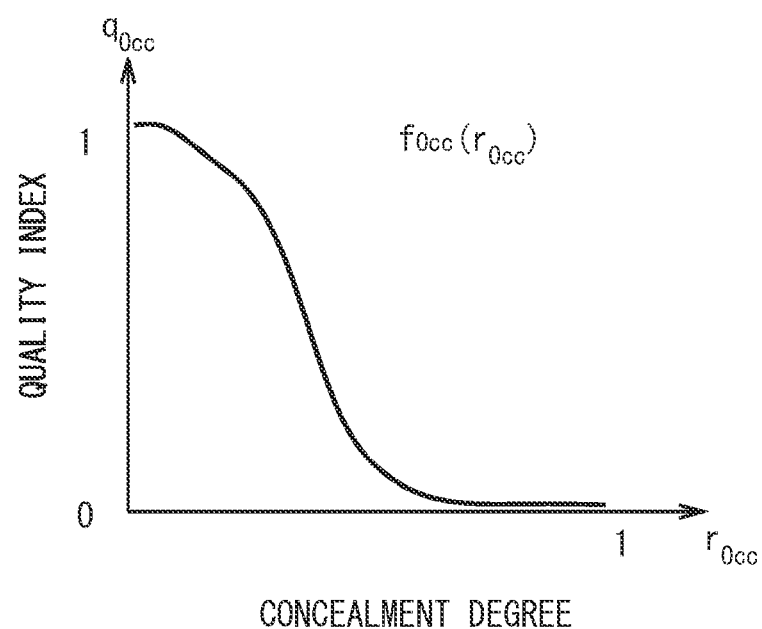
FIG. 17A is a diagram exemplifying a function representing a quality index.
Figure 17B:
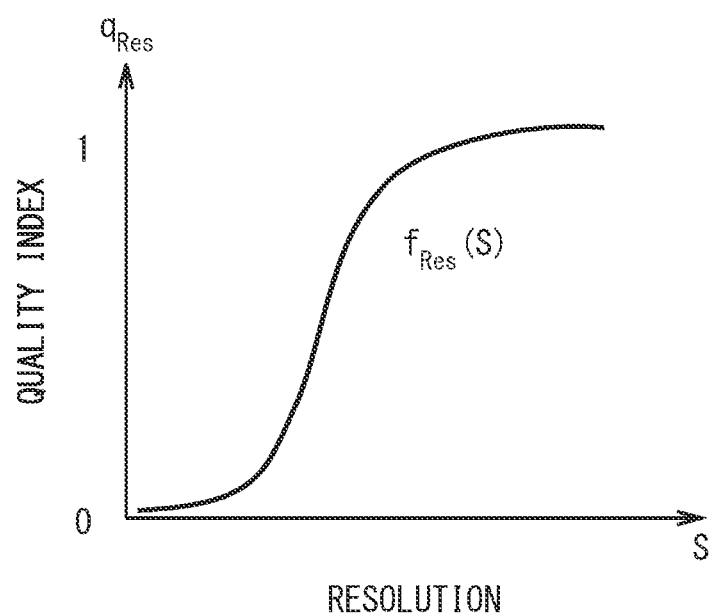
FIG. 17B is a diagram exemplifying a function representing a quality index.

Here, $f_{Res}(S)$ is a monotonic non-decreasing function having a range of [0, 1] and is expressed as, for example, FIG. 17B. This function may be used as, for example, $f_{Res}(S)$ to obtain the relation between the size S and the matching accuracy.

If the motion of an object on the image is large, the possibility that a fine pattern on the surface of the object (for example, the pattern of clothes if the object is a person) cannot be properly extracted is increased due to the influence of a motion blur. Thus, it is considered that as the motion of the object on the image is larger, the quality of the feature decreases. Thus, assuming that the motion amount of the object on the image is v, the value of a quality index $q_{Mot}$ based on the motion can be obtained by Expression (2).

[Expression 2]

$$q_{Mot}=f_{Mot}(v) \quad (2)$$

Figure 17C:
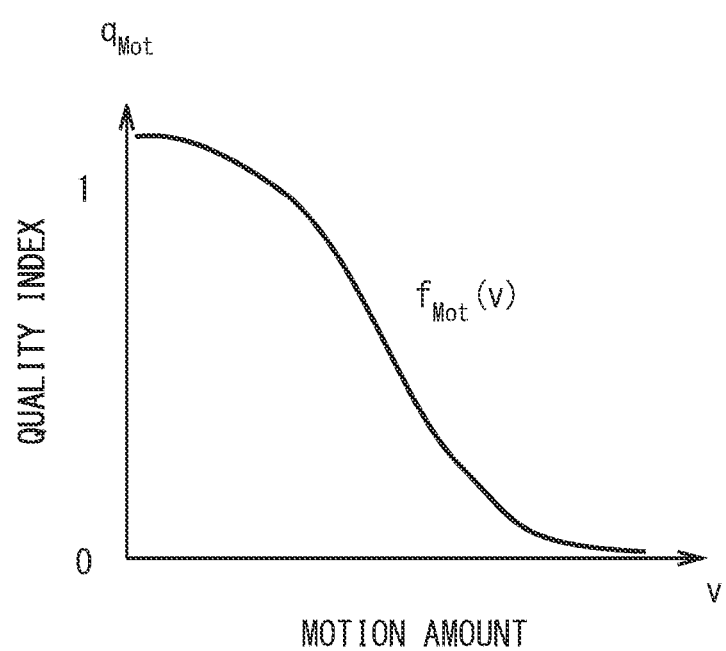
FIG. 17C is a diagram exemplifying a function representing a quality index.

Here, $f_{Mot}(v)$ is a monotonic non-increasing function having a range of [0, 1] and is expressed as, for example, FIG. 17C. This function may be used as, for example, $f_{Mot}(v)$ to obtain the relation between the motion amount v on the image and the matching accuracy. In addition, the motion amount v can be obtained from the motion history of the tracking target object. For example, using position information at a plurality of times before and after the extraction time $T_{cur}-\tau$, the motion amount v on the image at the extraction time $T_{cur}-\tau$ can be obtained.

In addition, if the posture or orientation of the object is largely deviated from the posture or orientation expected in feature extraction, the extracted feature can be possibly deviated from the expectation. Thus, it is considered that as the deviation of the posture or orientation of the object from the expected posture or orientation is increased, the quality of the feature decreases. For example, if the object is a person and the person crouches or bends down, the deviation from an expected posture is increased when the posture expected in the feature extraction is an upright posture. A value representing this degree is referred to as a posture change degree (an index in which a value is increased as the deviation from an expected posture is increased), and the posture change degree is represented by $r_{Pos}$. Then, the value of a quality index $q_{Pos}$, based on the posture or orientation is expressed by Expression (3).

$$q_{Pos}=f_{Pos}(r_{Pos}) \quad \text{[Expression 3]}$$

Figure 17D:
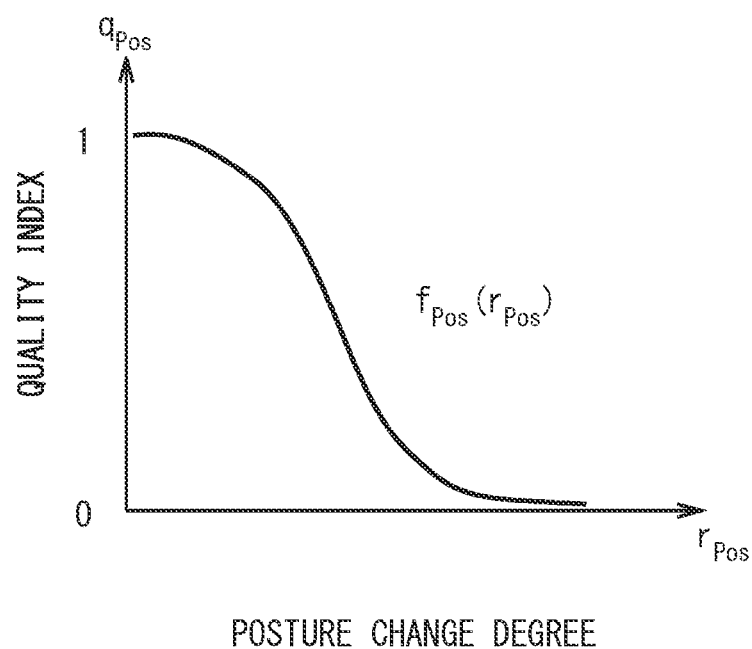
FIG. 17D is a diagram exemplifying a function representing a quality index.

Here, $f_{Pos}(r_{Pos})$ is a monotonic non-increasing function having a range of [0, 1] and is expressed as, for example, FIG. 17D. This function may be used as, for example, $f_{Pos}(r_{Pos})$ to obtain the relation between the posture change degree $r_{Pos}$ and the matching accuracy.

In addition, the posture change degree $r_{Pos}$ can be defined by, for example, how much the aspect ratio of an object detection rectangle is deviated from the aspect ratio of an object circumscribing rectangle in the case of an expected posture. For example, by obtaining the absolute value of the difference between the aspect ratio of the detection rectangle and the aspect ratio of the object circumscribing rectangle with respect to the expected posture, the absolute value is used as the posture change degree. Alternatively, when calibration information is available in the case of a fixed camera, the size of the object in the real space can be obtained from the size of the rectangle of the image. Thus, by obtaining the size of the object (for example, in the case of a person, the height of the person) in the real space from the tracking result of the object and checking the time-series change at the extraction time $T_{cur}-\tau$, posture change can be detected. That is, the posture change degree can be defined depending on the degree of change in size in the real space. In addition, the orientation of the object may be considered. There are various methods for determining the orientation of the object. For example, by assuming that the moving direction and the orientation of the object are aligned, the moving direction of the object can be specified from the position history of the tracking result to estimate the orientation. Then, the posture change degree may be defined by the amount of the deviation between the estimated orientation and the orientation expected in the feature extraction (for example, the front or the like).

From the quality index for each factor obtained in this manner, a total quality index is calculated. A function $g_1$ representing the relation between the quality index for each factor and a total quality index Q is defined as in Expression (4) and used.

[Expression 4]

$$Q=g_1(q_{Res},q_{Mot},q_{Pos}) \quad (4)$$

As the function of Expression (4), a function shown in Expression (5) can be used, for example.

[Expression 5]

$$g_1(q_{Res}, q_{Mot}, q_{Pos}) = q_{Res} q_{Mot} q_{Pos} \quad (5)$$

Note that, various factors have been described above, but all the factors do not need to be considered, and a part of them may be considered. In this case, the value of a quality index for a factor that is not considered may be regarded as 1, and the quality index may be calculated in accordance with Expression (4).

The above quality index is calculated for each tracking target object included in the object tracking result at the extraction time $T_{cur}-\tau$. Then, the calculated quality index is associated with the ID of the tracking target object and the information about the corresponding detected object ID and output.

With the above, it is possible to predict that the quality of a feature is deteriorated due to the resolution, the motion, and the posture, and to select an object to be subjected to feature extraction. Especially, by slightly delaying a feature extraction time, future tracking result information ahead of the feature extraction point can be used. Thus, it is possible to more accurately determine the object state and to appropriately perform object selection.

Figure 4:
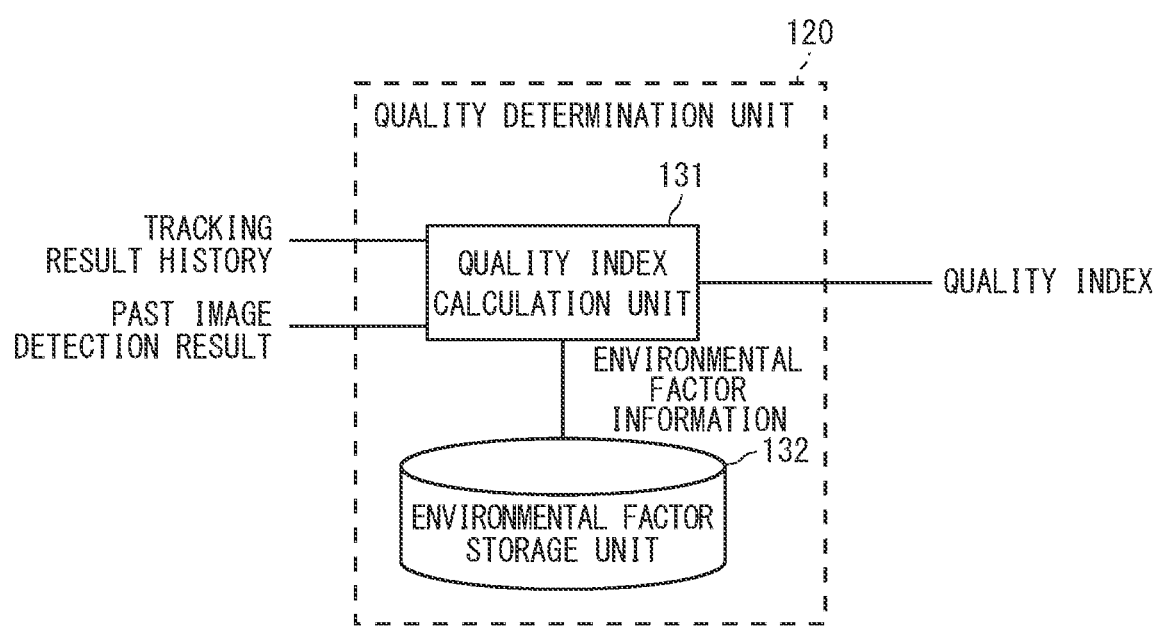
FIG. 4 is a block diagram exemplifying another quality determination unit of the object selection means in the object feature extraction device according to the first example embodiment.

Next, another example embodiment of the quality determination unit 120 in FIG. 2 is described. FIG. 4 is a block diagram exemplifying another quality determination unit of the object selection means in the feature extraction device according to the first example embodiment. As shown in FIG. 4, another example of the quality determination unit 120 includes a quality index calculation unit 131, and an environmental factor storage unit 132. The quality index calculation unit 131 calculates, based on the object detection result and the object tracking result, a quality index and outputs it.

Next, the operation of the quality determination unit 120 in FIG. 4 is described. The environmental factor storage unit 132 stores a value of a quality index for feature quality deterioration caused by environmental factors. The environmental factors affecting the quality of a feature includes occlusion by obstacles (a shelf, a desk, and the like) placed in the environment, deterioration due to improper illumination or sunshine conditions, deterioration due to blurring caused by a camera being out of focus, and the like. In the case of a fixed camera, these deterioration factors occur at certain locations on the image. Thus, the degree of quality deterioration caused when an object appears at each location on the image is estimated, and the value of a quality index indicating that degree is associated with the location and stored in the environmental factor storage unit 132. That is, the value of the quality index, which is shown in Expression (6), based on an environmental factor is obtained for each coordinates (x, y) on the image and stored.

[Expression 6]

$$q_{Env} = f_{Env}(x, y) \quad (6)$$

Here, $f_{Env}(x, y)$ is a function having a range of [0, 1]. In addition, x and y are the position coordinates of the reference point of the object, and the center coordinates of the grounding point of the object can be used, for example. The value of the function $f_{Env}(x, y)$ is determined based on the result of, for example, obtaining how much the matching accuracy is deteriorated due to an environmental factor caused when the object appears at the position (x, y) on the image.

Note that, although this is not an environmental factor, a part of an object in the peripheral region of the camera image is out of the image, and a situation equivalent to the case of partial occlusion occurs. For this reason, the image peripheral region may be treated similarly to occlusion by an obstacle. In addition, among the above factors that affect the quality of a feature, the resolution can be considered together with an environmental factor. Thus, the quality index based on the resolution may be included in the quality index based on an environmental factor.

Note that, the above position information (x, y) may not be on the image but may be real-world coordinates or a value obtained by converting the coordinates into the coordinates on a map image. In this case, after converting the position information of the object into the corresponding coordinate system, the quality index shown in the Expression (6) is obtained.

In addition, illumination and sunshine conditions can change depending on the time period, for example, differences between day and night. Thus, the value of the quality index for each time period may be stored in the environmental factor storage unit 132, and the information may be switched and used depending on the time period of the video to be processed. Alternatively, in a situation where the environmental conditions change, the value of the quality index may be obtained by interpolation from the value of the quality index in the time period before and after that time.

The quality index calculation unit 131 calculates the total quality index in consideration of, in addition to the factors described in the description for the operation of the quality index calculation unit 130, environmental factors. Specifically, the position (x, y) of the object at the current time is obtained from the position information about the tracking target object included in the object tracking result, and the value of the quality index $q_{Env}$ based on the environmental factor at that position is obtained from the environmental factor storage unit 132. Then, a function $g_2$ representing the relation between the quality index for each factor and the total quality index Q is defined as in Expression (7) and used.

[Expression 7]

$$Q = g_2(g_{Res}, g_{Pos}, g_{Env}) \quad (7)$$

As the function of Expression (7), a function shown in Expression (8) can be used, for example.

[Expression 8]

$$g_2(q_{Res}, q_{Mot}, q_{Pos}, q_{Env}) = q_{Env} g_1(q_{Res}, q_{Mot}, q_{Pos}) \quad (8)$$

With the above, although an object appears at a certain position and the quality is deteriorated, it is possible to appropriately predict the deterioration of the quality of the feature.

With the above, it is possible to predict the deterioration of the quality of a feature caused by the environment in addition to the factors of the resolution, the motion, and the posture, and to more appropriately select an object to be subjected to feature extraction. In addition, although the quality of a feature to be extracted changes depending on the time, by switching the quality index based on an environmental factor depending on the time period, it is possible to properly handle the change.

Figure 5:
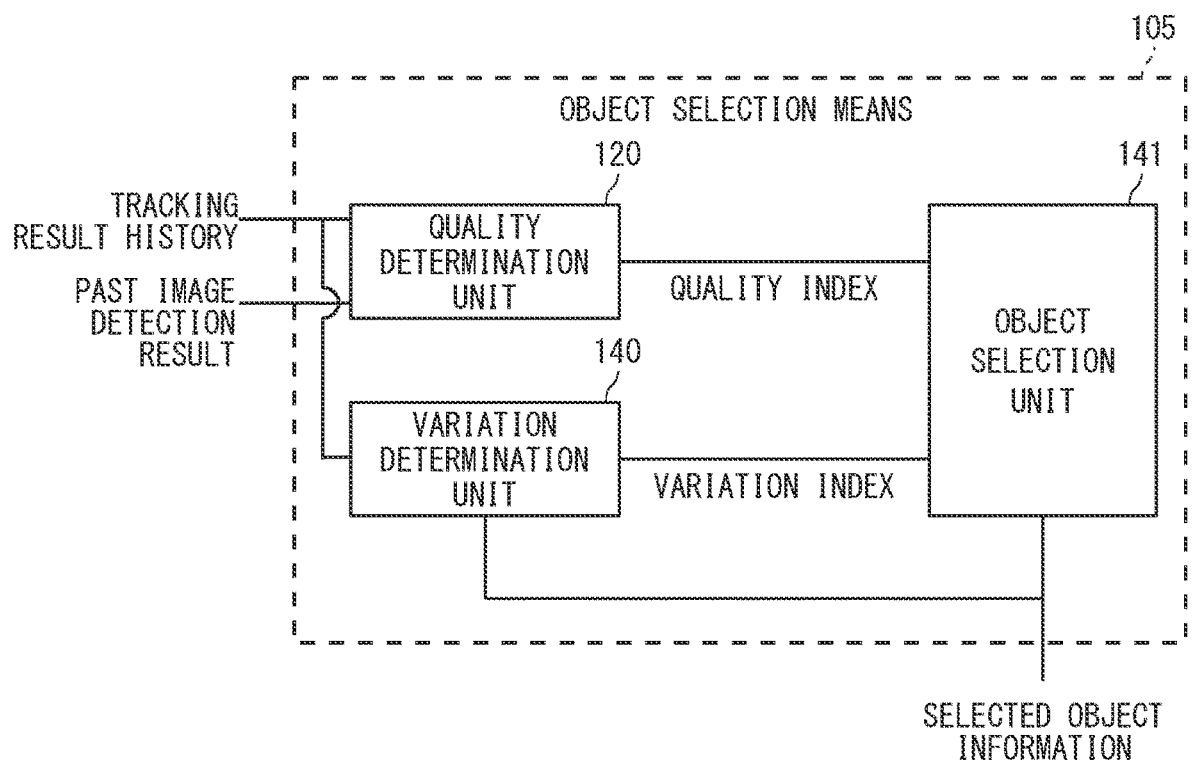
FIG. 5 is a block diagram exemplifying another object selection means in the object feature extraction device according to the first example embodiment.

Next, another example embodiment of the object selection means 105 in FIG. 1 is described. FIG. 5 is a block diagram exemplifying another object selection means in the feature extraction device according to the first example embodiment. As shown in FIG. 5, another object selection means 105 includes a quality determination unit 120, a variation determination unit 140, and an object selection unit 141.

The quality determination unit 120 obtains a quality index based on an input object tracking result history and past image object detection result and outputs it to the object selection unit 141. The variation determination unit 140 obtains a variation index based on the input object tracking result history and the selected object information fed back from the object selection unit 141 and outputs it the object selection unit 141. The object selection unit 141 selects, based on the quality index output from the quality determination unit 120 and the variation index output from the variation determination unit 140, an object whose feature is to be extracted, and outputs selected object information. This selected object information is also output to the variation determination unit 140 for variation determination at a later time.

Next, the operation of the object selection means 105 in FIG. 5 is described. The operation of the quality determination unit 120 is similar to that in FIG. 2, and the obtained quality index is output to the object selection unit 141.

Meanwhile, the variation determination unit 140 stores the object selection information output at an earlier time and calculates a variation index of each tracking target object in the image at the extraction time $T_{cur}-\tau$ included in the input object tracking result history.

The variation index is an index indicating the degree of improvement of variation (diversity) of an acquired feature. Since the feature of an object can change depending on the state of the object, it is desirable to extract the feature of the same object in various states in order to reduce omissions in object matching. On the other hand, if feature extraction is performed many times while the state of the object hardly changes, almost the same feature is only repeatedly acquired, which does not contribute to the reduction of omissions. That is, it is important, in feature acquisition of an object in time-series, to increase the variation of acquired features while avoiding redundant feature acquisition as much as possible. The variation index is an index obtained by predicting, before feature extraction, whether the variation of features can be increased by newly performing feature acquisition in addition to the features that have been already acquired, that is, whether the variation of acquired features can be improved. Thus, it is desirable to preferentially extract the feature of an object having a larger variation index, and the variation index can be used as an object selection criterion.

The details of the variation determination unit 140 will be described later. The calculated variation index is associated with the ID of the tracking target object and output to the object selection unit 141.

The object selection unit 141 calculates a selection index I by combining an input quality index Q and variation index V. Assuming that this function is F, and this can be formulated as in Expression (9).

[Expression 9]

$$I=F(Q,V) \quad (9)$$

As the function of Expression (9), a function in Expression (10) can be used, for example.

[Expression 10]

$$F(Q,V)=QV \quad (10)$$

Then, a tracking target object having a large selection index I value is selected. Specifically, an object whose selection index value is larger than a certain value is selected. Alternatively, by sorting tracking target objects by selection index values, a certain number of tracking target objects having larger values (if the number of objects is less than the certain number, all of the tracking target objects) are selected. Alternatively, by combining both criteria, objects may be selected (for example, a certain number of objects having larger values may be selected from objects having selection index values larger than the certain value).

The ID of the selected tracking target object is combined with the ID of the corresponding detected object and the extraction time information, and output as selected object information. In addition, the selected object information is also output to the variation determination unit 140 and is used to calculate a variation index at a later time.

Figure 6:
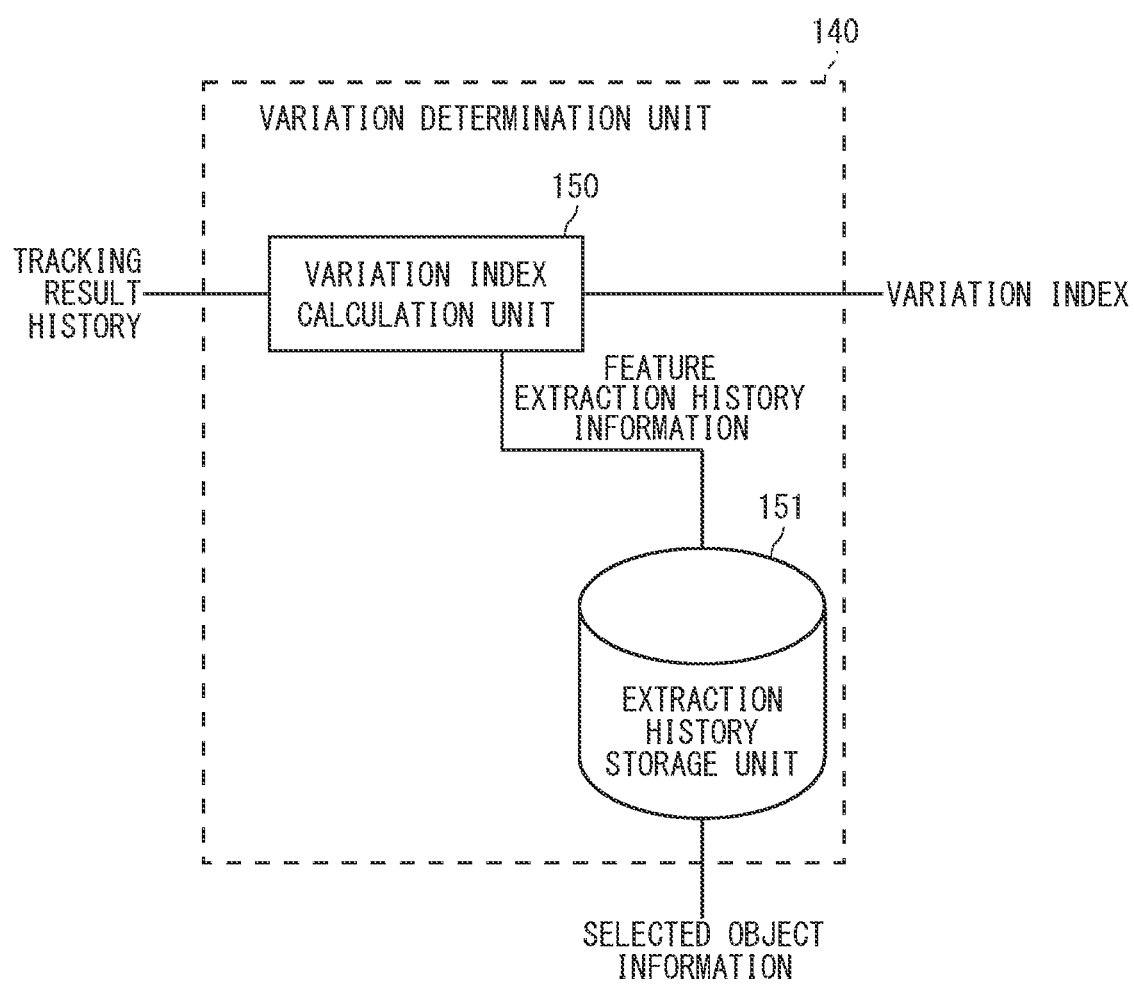
FIG. 6 is a block diagram exemplifying a variation determination unit of another object selection means in the object feature extraction device according to the first example embodiment.

Next, the details of the variation determination unit 140 are described. FIG. 6 is a block diagram exemplifying a variation determination unit of another object selection means in the feature extraction device according to the first example embodiment. As shown in FIG. 6, the variation determination unit 140 includes a variation index calculation unit 150 and an extraction history storage unit 151.

The extraction history storage unit 151 updates and stores, based on the input selected object information, the feature extraction history of each object, and outputs feature extraction history information to the variation index calculation unit 150. The variation index calculation unit 150 calculates a variation index based on the input object tracking result history and the feature extraction history information output from the extraction history storage unit 151 and outputs it.

Next, the operation of the variation determination unit 140 in FIG. 6 is described. The extraction history storage unit 151 stores, for the ID of each tracking target object, information about the time at which the object is selected as an object whose feature is to be extracted. When the selected object information is input to the extraction history storage unit 151, the information about the time at which the object is selected is added for the ID of the tracking target object included in the selected object information. The extraction history storage unit 151 may further record information about how many times the feature extraction for the ID of each tracking target object has been performed in the past. In this case, the number of feature extractions for each tracking target object included in the selected object information is incremented by one.

The variation index calculation unit 150 calculates a variation index of each tracking target object in the image at the extraction time $T_{cur}-\tau$ included in the input object tracking result history. As described above, it is important to increase the variation of features in order to reduce omissions in matching. This depends on the feature acquisition history until that point. When a certain period of time elapses since the last feature has been acquired, the state of the object changes, and a feature for improving the variation can possibly be extracted. Thus, the variation index can be formulated as in Expression (11).

[Expression 11]

$$V=h_1(t) \quad (11)$$

Figure 19A:
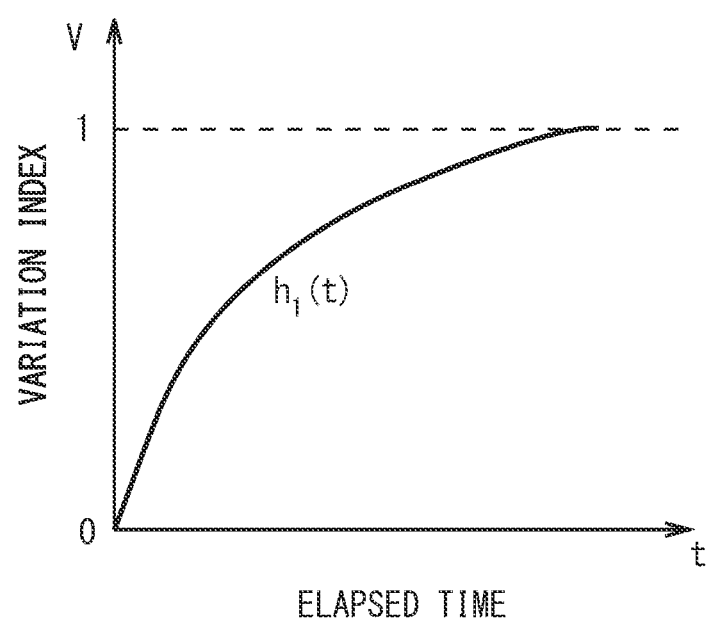
FIG. 19A is a diagram exemplifying a function representing a variation index.

Here, a function $h_1(t)$ is a monotonic non-decreasing function having a range of [0, 1] with respect to an elapsed time t from the last feature extraction to the extraction time $T_{cur}-\tau$ which is the latest feature extraction target time. As this function, a function shown in FIG. 19A can be used, for example. Note that, if feature extraction has not been performed yet, the last feature extraction time is defined as $t=-\infty$, and the value of the variation index is defined as $h_1(\infty)$.

The elapsed time simply from the last feature extraction is only considered in the above example, but the number of feature extractions in the past may be also considered. Since it is considered that the variation of the acquired features is increased as the number of feature extractions is increased, it is considered that the frequency of feature extraction may be reduced as the number of feature extractions is increased. Thus, a function for reducing the value of the variation index as the number of feature extractions is increased is defined and used. That is, the variation index is formulated as in Expression (12) as a function for the elapsed time t and the number of feature extractions n.

[Expression 12]

$$V=h_2(t,n) \quad (12)$$

Figure 19B:
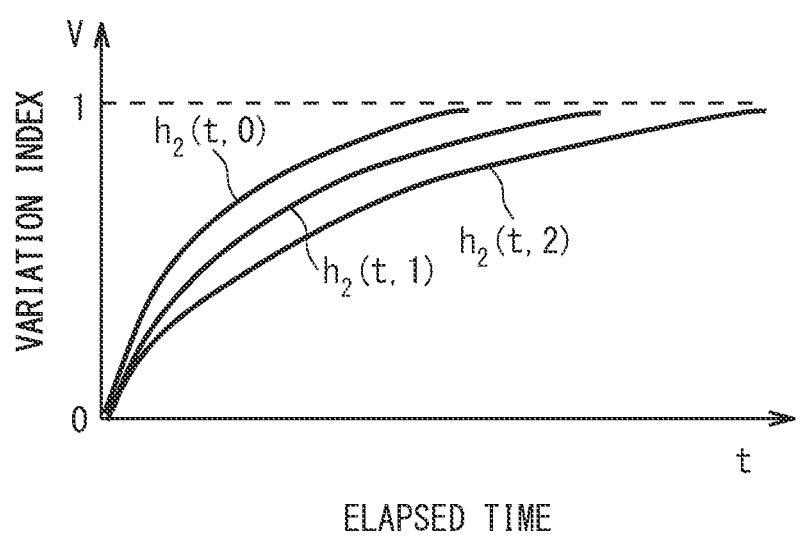
FIG. 19B is a diagram exemplifying a function representing a variation index.

Here, a function $h_2(t, n)$ has a range of [0, 1] and is a monotonic non-decreasing function of t when n is fixed, or is a monotonic non-increasing function of n when t is fixed. For example, a function shown in FIG. 19B can be used.

The feature extraction history is only used in the above example, but tracking result history information may be also used. If an object, which has been subjected to feature extraction and a certain period of time has elapsed from the last feature extraction, stays at the same position, its state can possibly hardly changes. Thus, even if feature extraction is performed, substantially the same feature as the last time is highly possibly obtained. On the other hand, in the case of an object that is moving, its state can possibly largely change even if the elapsed time from the last feature extraction is short. Thus, the tracking result history information about the object is used to determine how much the object has moved, and the value of the variation index is changed depending on the obtained movement amount.

For example, from the position information about the object before and after the extraction time $T_{cur}-\tau$ included in the object tracking result history information, the movement amount of the object at this time is calculated. For example, the difference between the position at the time $T_{cur}-\tau-\Delta T$ and the position at the time $T_{cur}-\tau+\Delta T$ is obtained as a movement amount d. This movement amount may be obtained as the movement amount on the image or as the movement amount in real-world by converting it into a real-world coordinate system. Then, the variation index is formulated as in Expression (13) as a function of the elapsed time t, the number of feature extractions n, and the movement amount d.

[Expression 13]

$$V=h_3(t,n,d) \quad (13)$$

Figure 19C:
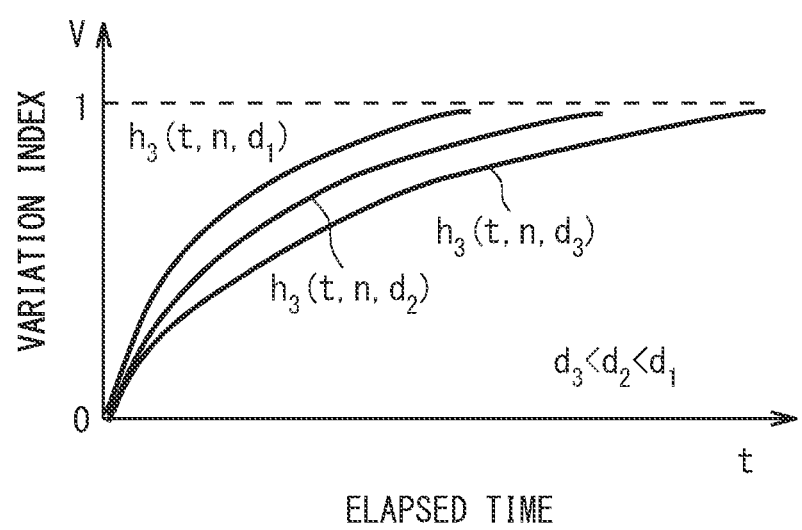
FIG. 19C is a diagram exemplifying a function representing a variation index.

Here, a function $h_3(t, n, d)$ has a range of [0, 1], and is a monotonic non-decreasing function of t when n and d are fixed, is a monotonic non-increasing function of n when t and d are fixed, and is a monotonic non-decreasing function of d when t and n are fixed. For example, a function shown in FIG. 19C can be used.

When the object tracking result history information is used, other information about the state of the object, such as the orientation of the object, can further be obtained. If the feature can change depending on the state of the object, the feature in each state is extracted, held, and used for matching in order to further reduce omissions. Thus, the history of feature extractions is obtained by classifying the states of the object and used to calculate the variation index depending on the state of the object at that time.

The category indicating the state of the object is referred to as $c=1, \ldots$, or C. This category relates to the orientation of the object, for example, front, right, back, and left. The variation index is formulated as in Expression (14) for each category c.

[Expression 14]

$$V=h_{3,c}(t_c,n_c,d_c) \quad (14)$$

Here, a function $h_{3,c}$ is a function for obtaining the function $h_3$ in Expression (13) for each category c. First, it is estimated, based on object tracking result, which category the current state of the object falls into, and the function of the estimated category is used to calculate the variation index. For example, if the category is for the orientation, the moving direction of the object is obtained from the object tracking history to estimate the orientation based on the moving direction. If the orientation cannot be obtained, a category for unknown orientation may be provided to calculate the variation index.

Note that, the category may not be necessarily for the orientation, and various categories reflecting the state of the object can be used. If it is difficult to categorize the state of the object only with tracking information, the state of the object may be categorized including other information.

The above variation index V is calculated for each tracking target object in the image at the extraction time $T_{cur}-\tau$ included in the object tracking result history. Then, the calculated variation index is associated with the ID of the tracking target object and output.

With the above, it is possible to appropriately select an object to be subjected to feature extraction considering, from the feature extraction history, not only the quality but also the variation of the acquired feature.

Figure 7:
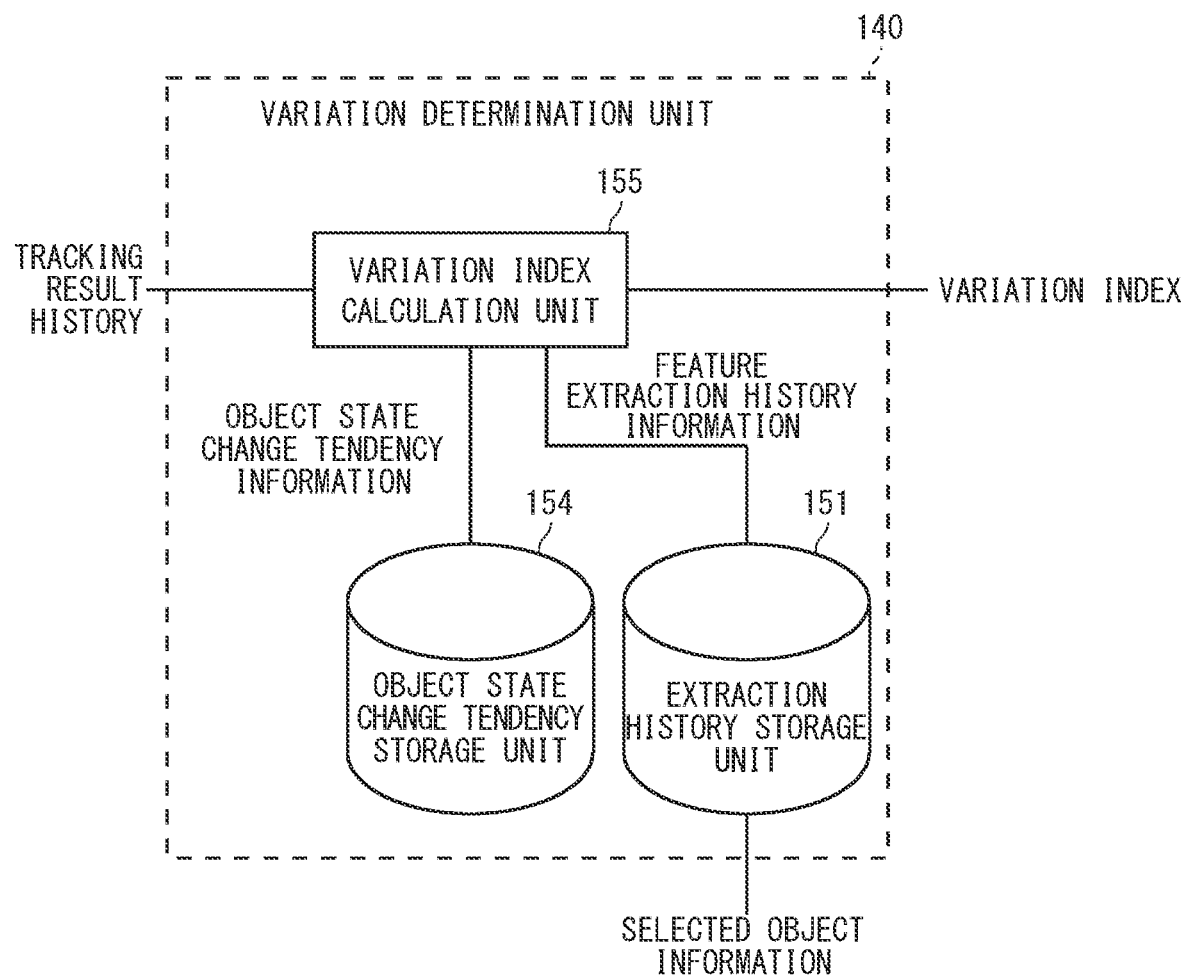
FIG. 7 is a block diagram exemplifying another variation determination unit in the object feature extraction device according to the first example embodiment.

Next, another example embodiment of the variation determination unit 140 is described. FIG. 7 is a block diagram exemplifying another variation determination unit in the feature extraction device according to the first example embodiment. As shown in FIG. 7, another variation determination unit 140 includes a variation index calculation unit 155, an extraction history storage unit 151, and an object state change tendency storage unit 154.

The extraction history storage unit 151 updates and stores, based on the input selected object information, the feature extraction history of each object and outputs feature extraction history information to the variation index calculation unit 155. The object state change tendency storage unit 154 stores information about the tendency of the object state depending on the location and outputs object state change tendency information to the variation index calculation unit 155. The variation index calculation unit 155 calculates the variation index based on the input object tracking result, the feature extraction history information output from the extraction history storage unit 151, and the object state change tendency information output from the object state change tendency storage unit 154 and outputs it.

Next, the operation of the variation determination unit 140 shown in FIG. 7 is described. The operation of the extraction history storage unit 151 is similar to that in FIG. 6.

The object state change tendency storage unit 154 stores information indicating the tendency of state change of an object that can change depending on the location on the image. The tendency of an object to easily take a certain state can be different depending on the location where the object is. For example, if the object is a person and a camera is installed on a corner of a passage and capable of capturing the person turning the corner while the person is walking, features of the person in various directions can be extracted when the person is turning at the corner. On the other hand, at other positions, the relation between the direction of the person and the orientation of the camera hardly changes, and features only in certain directions are highly possibly extracted. In this manner, when the degree of change in the state of an object is different depending on the location, by more frequently performing feature extraction at a location where the state easily changes than a location where the state hardly changes, it is possible to efficiently extract various variation features. Thus, a multiplier α shown as in Expression (15) reflecting the likelihood of state change is defined for each location (x, y) and stored in the object state change tendency storage unit 154.

[Expression 15]

$$\alpha = h_{Loc}(x, y) \tag{15}$$

Here, a function $h_{Loc}$ is a function having a range of [0, 1] and is a larger value at a location on the image where the state of the object easily changes.

The variation index calculation unit 155 calculates, as a variation index V, a value by multiplying the variation index V obtained by the method described in the operation of the variation index calculation unit 150 by the multiplier a of Expression (15). More specifically, the position (x, y) of the tracking target object is obtained from the object tracking result information, and based on this value, the value of the multiplier α as the object state change tendency information is read to multiply the value of the variation index V. The calculated variation index is associated with the ID of the tracking target object and output.

In this manner, by considering the tendency of change in the object state depending on the location, it is possible to more accurately reflect the change in the feature of the object into the variation index, and to more appropriately perform object selection.

It has been described above that object selection is performed for the image at the extraction time $T_{cur}-\tau$, but this selection is not necessarily performed for one image and may be collectively performed for a plurality of images. For example, the object selection may be collectively performed for each time section D of the video.

Figure 8:
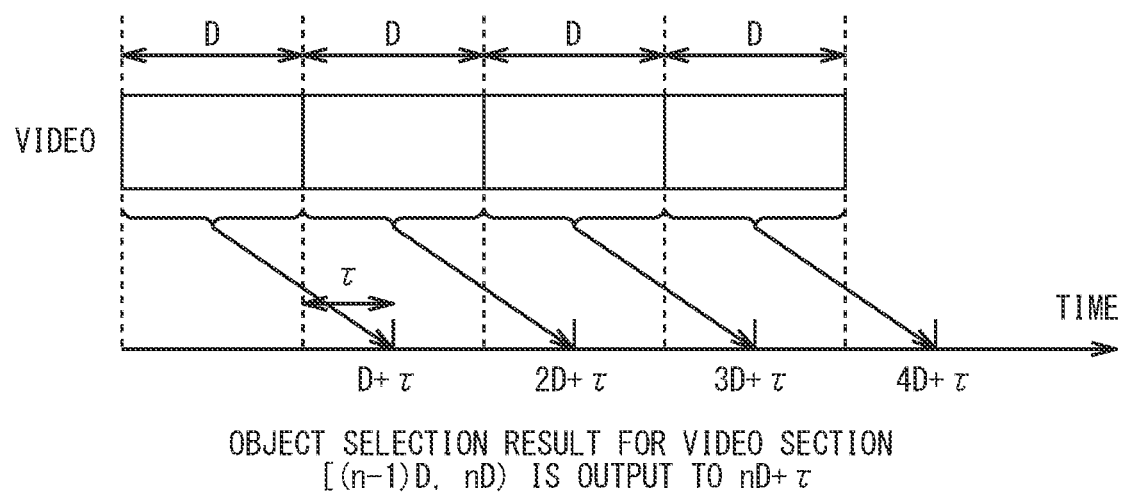
FIG. 8 is a diagram showing temporal relation between a video section in which object selection is performed and a timing at which the object selection is performed in the object feature extraction device according to the first example embodiment.

FIG. 8 is a diagram showing temporal relation between a video section in which object selection is performed and a timing at which the object selection is performed in the feature extraction device according to the first example embodiment. Here, FIG. 8 shows that object selection for a video section [(n−1)D, nD) (n is a natural number) is performed at a time nD+τ and that the result is output. For example, object selection for a video section [0, D) and output of the result are performed at a time D+τ. In the following, it will be described firstly that the object selection means 105 shown in FIG. 1 performs object selection using only the quality index as shown in FIG. 2 and secondly that the object selection means 105 performs object selection using both the quality index and the variation index as shown in FIG. 5.

When performing object selection using only the quality index, the object selection means 105 collectively selects objects included in the frames included in the video section [(n−1)D, nD) when the current time $T_{cur}$ reaches the object selection timing $T_{cur}=nD+\tau$.

For this selection, the quality determination unit 120 first reads the past image detection result for the corresponding section and the tracking result history for [(n−1)D−ΔT, $T_{cur}$]. Then, the quality index of each object detected in the frames included in the video section [(n−1)D, nD) is calculated, associated with the ID of the tracking target object, the time information, and the information about the corresponding detected object ID, and output to the object selection unit 121.

The object selection unit 121 basically selects objects having larger quality indexes. However, if the selected objects are biased to a certain tracking target object ID, tracking target objects ID as many as possible may be selected. For example, one having the largest quality index is selected for each tracking target object ID, and then objects having higher quality may be selected for the rest.

The number of objects to be selected does not need to be constant for each frame and may be different from each frame. For example, when the number of frames included in the corresponding video section is $N_{Frm}$ and the average number of objects to be selected for one frame needs to be $N_{Obj}$ or less due to the time constraint of feature extraction processing, the number of objects to be selected for each frame may not be the same as long as the number of objects to be selected N satisfies Expression (16).

[Expression 16]

$$N \le N_{Frm} N_{Obj} \tag{16}$$

Thus, the target number for the number of objects to be selected is set to $N_{Frm}N_{Obj}$, and objects less than or equal to this number are selected.

At this time, if the number of objects to be selected does not reach the target number and has a margin, the target number in the next object selection section [nD, (n+1)D) may be increased by that margin.

The information about the objects selected in this manner is output as selected object information to the object feature extraction means 106. The selected object information is information obtained by combining the ID of each select tracking target object, its time information, and the ID of the corresponding detected object.

When the selected object information for the video section [(n−1)D, nD) is input, the object feature extraction means 106 reads the image of the corresponding frame and the object detection result from the image storage means 107 and the detection result storage means 108 respectively to extract the features of the objects. The operation of object extraction is as described above.

Note that, it has been described that object selection is performed by dividing the video by a certain time length D in the above example, but D is not necessarily fixed, and may be variable to be adaptively controlled. For example, if the number of detected objects is small, D is set to one frame interval to minimize the delay. Then, when the number of objects becomes large, D may be increased to collectively perform object selection for several frames. In this manner, it is possible to perform optimal object selection for a plurality of frames while reducing the delay.

Next, it will be described that object selection is performed using both the quality index and variation index.

The quality determination unit 120 is as described above and calculates the quality index of the objects detected in the frames included in the video section [(n−1)D, nD) and outputs them to the object selection unit 141.

The variation determination unit 140 reads the tracking result history for the frames included in the video section

[(n−1)D−ΔT, $T_{cur}$]. Based on this and the internally-held object selection information before that point, the variation index of each object detected in the frames included in the video section [(n−1)D, nD) is calculated. The method for calculating the variation index is similar to the case of selecting an object in the unit of one frame, but the values of the elapsed time t and the number of feature extractions n are the values at the start time (n−1)D of the video section. The calculated variation index is associated with the tracking target object ID and output to the object selection unit 141.

The object selection unit 141 calculates a selection index I obtained by combining the quality index Q and the variation index V to select objects having higher selection indexes. Regarding the number of objects to be selected, the number of objects to be selected for each frame may not be the same as long as Expression (16) is satisfied. The subsequent processing is similar to the case of performing object selection using only the quality index described above.

However, strictly, when an object is selected by the object selection unit 141, the variation index V of the object changes. Next, the operation when object selection is performed in consideration of this point is described.

In this case, the object selection unit 141 first selects the object having the largest selection index I. Then, the information about the selected object is output as selected object information. This information is also fed back to the variation determination unit 140. Since the object selection history of the selected object is changed at the time of feedback, the variation determination unit 140 recalculates the variation index V for the tracking target object ID and outputs it to the object selection unit 141. The object selection unit 141 recalculates the selection index using the recalculated variation index V, selects the object having the largest selection index, and outputs the information about the selected object. This operation is repeated until the number of objects to be selected reaches the target number or until another condition (for example, the selection index I is below a certain value or the like) is satisfied. In this manner, each time one object is selected, the variation index of the object is recalculated and selected, and thus it is possible to perform more suitable object selection.

In this case, the object feature extraction means 106 may perform feature extraction of the objects when all the selected object information is obtained or may sequentially extract a feature each time selected object information is output.

In this manner, by collectively performing object selection for a plurality of frames, it is possible to further increase the flexibility of object selection and to perform more suitable object selection than the case of performing selection for each frame.

Second Example Embodiment

Figure 9:
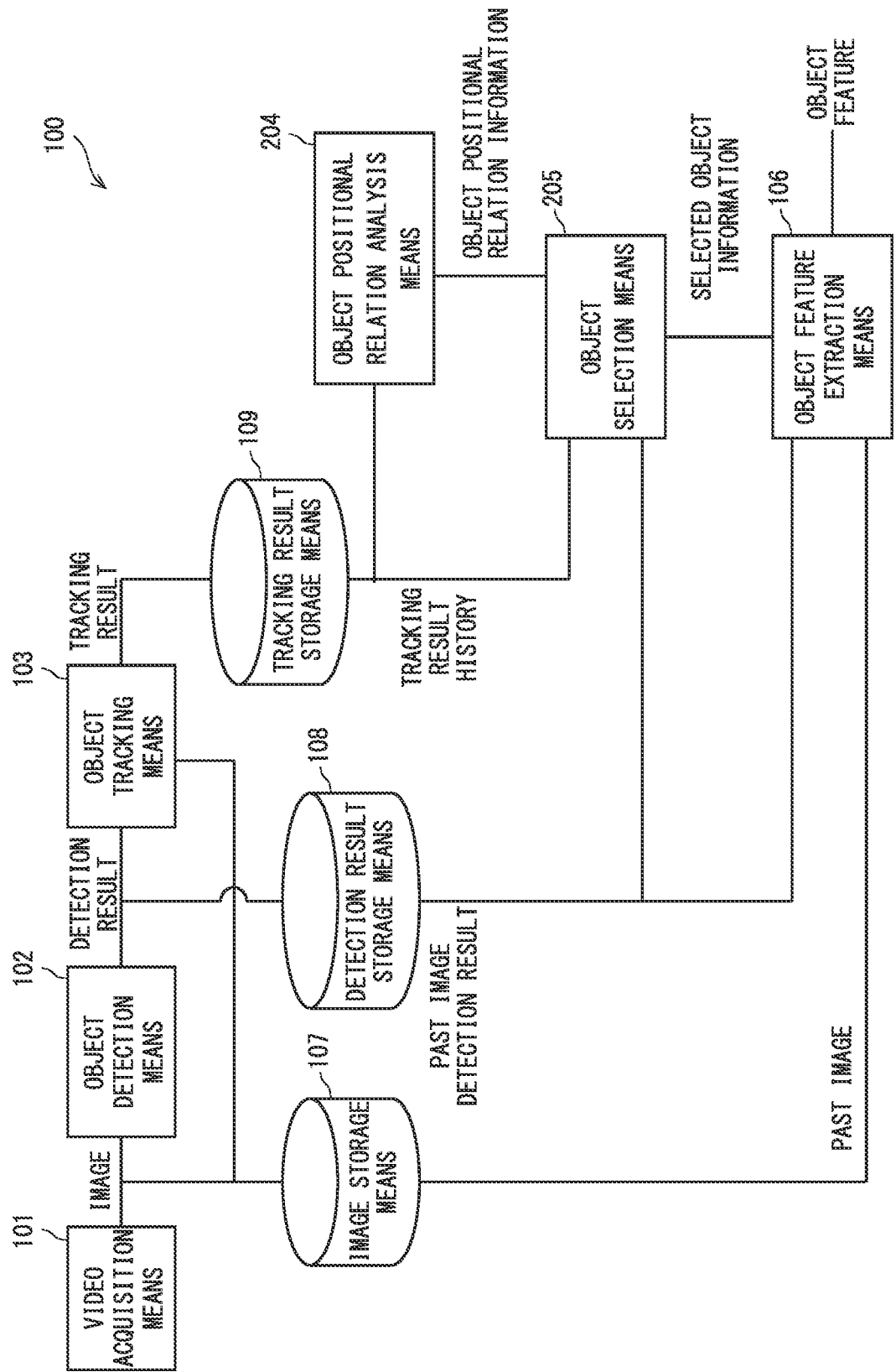
FIG. 9 is a block diagram exemplifying a configuration of an object feature extraction device according to a second example embodiment.

A second example embodiment will be described. FIG. 9 is a block diagram exemplifying a configuration of an object feature extraction device according to the second example embodiment.

As shown in FIG. 9, an object feature extraction device 100 according to the present example embodiment is different from the object feature extraction device 100 in FIG. 1 in that an object positional relation analysis means 204 is newly added and that an object selection means 205 is provided instead of the object selection means 105, as compared to the object feature extraction device 100 in FIG. 1.

The connection relation among a video acquisition means 101, an object detection means 102, an object tracking means 103, an image storage means 107, and a detection result storage means 108 is similar to that in FIG. 1. A tracking result storage means 109 is also similar, but its output is connected to the object positional relation analysis means 204. The object positional relation analysis means 204 obtains, based on tracking result history information output from the tracking result storage means 109, the positional relation between objects and outputs object positional relation information to the object selection means 205. The object selection means 205 selects, based on past image tracking result output from the detection result storage means 108, the tracking result history information output from the tracking result storage means 109, and the object positional relation information output from the object positional relation analysis means 204, an object to be subjected to feature extraction, and outputs selected object information to the object feature extraction means 106. The object feature extraction means 106 extracts, from the image output from the image storage means 107 based on an object detection result output from the detection result storage means 108, a feature of the object included in the selected object information output from the object selection means 205.

Next, the operation of the object feature extraction device 100 in FIG. 9 is described.

The operation of the video acquisition means 101, the object detection means 102, the object tracking means 103, the image storage means 107, the detection result storage means 108, and the tracking result storage means 109 is similar to that in FIG. 1.

The object positional relation analysis means 204 compares the position information about each object included in the tracking result output from the tracking result storage means 109 to analyze the positional relation between the tracking target objects for each frame. Specifically, it is determined whether objects overlap with each other and which object is in the foreground when overlapping, and the object positional relation information is generated.

In the overlapping determination, for example, it is determined whether the circumscribing rectangles of the tracking target objects overlap with each other. At this time, not only the information as to whether they overlap, but also the overlapping rate indicating the degree of overlapping may also be obtained.

In the foreground determination, in the case of the view angle of a general surveillance camera that captures images from diagonally above, an object appearing at a lower position can be regarded as being in the foreground. Thus, when it is determined that there is overlapping, it is determined, from the circumscribing rectangles on the image and the position information, that the object positioned at the lowest position is in the foreground and that other objects are occluded. Alternatively, the position information about the objects is converted into real-world coordinates, and the object closest to the camera may be determined as the object in the foreground.

In addition, the overlapping determination may be performed not on the entire object but on each part of the object. For example, the circumscribing rectangle of the object is divided into a plurality of regions, and the overlapping determination may be performed on each divided region. In this case, the overlapping rate may be calculated for each divided region.

The generated object positional relation information is output to the object selection means 205.

The details of the operation of the object selection means 205 will be described later. The generated selected object information is output to the object feature extraction means 106. The operation of the object feature extraction means 106 is similar that in FIG. 1.

Figure 10:
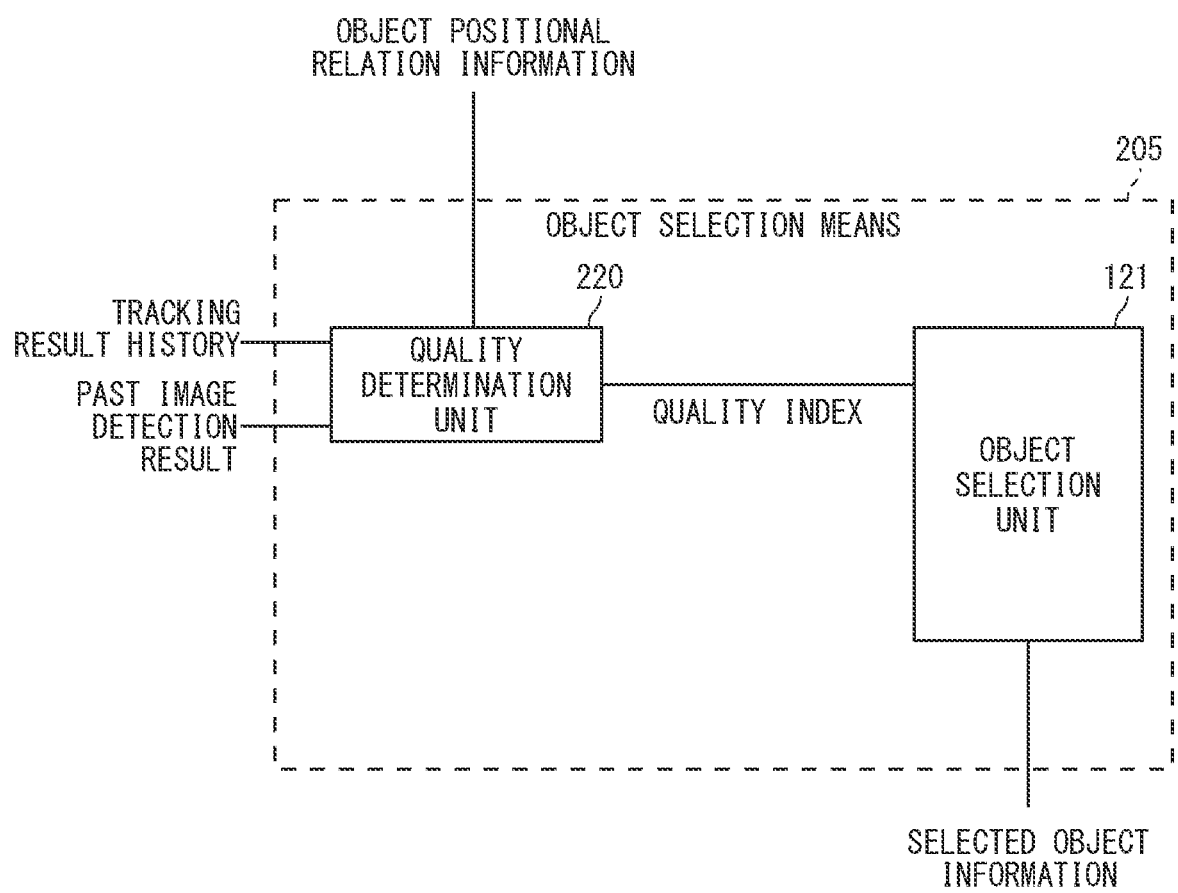
FIG. 10 is a block diagram exemplifying a configuration of an object selection means in the object feature extraction device according to the second example embodiment.

Next, the details of the object selection means 205 are described. FIG. 10 is a block diagram exemplifying a configuration of the object selection means in the object feature extraction device according to the second example embodiment.

As shown in FIG. 10, the object selection means 205 includes a quality determination unit 220 and an object selection unit 121.

The quality determination unit 220 obtains a quality index based on input object tracking result history information, a past image object detection result, and the object positional relation information, and outputs it to the object selection unit 121. The object selection unit 121 selects, based on the quality index output from the quality determination unit 220, objects whose features are to be extracted, and outputs selected object information.

Next, the operation of the object selection means 205 is described. The object tracking result history information, the past image object detection result, and the object positional relation information are input to the quality determination unit 220.

The quality determination unit 220 calculates the quality index of each object similarly to the quality determination unit 120 in FIG. 2. However, this case is different in that the quality index is calculated also using the object positional relation information.

First, by referring to the object positional relation information for each tracking target object included in the object tracking result history information, it is determined whether occlusion due to overlapping with another object occurs or not. When occlusion occurs, a part or all of the image region to be subjected to feature extraction does not belong to the object, and the feature to be extracted from that region is different from the original feature, which deteriorates the quality of the feature. Since the degree of deterioration changes depending on the degree of occlusion (hereinafter, referred to as an occlusion degree), the quality index is defined to decrease depending on the occlusion degree. Here, the occlusion degree can be defined as, for example, a rate of the region occluded by the front object in the object region (occlusion rate). Assuming that the occlusion degree is $r_{Occ}$ and the quality index based on the occlusion degree is $q_{Occ}$, it can be formulated as in Expression (17).

[Expression 17]

$$q_{Occ} = f_{Occ}(r_{Occ})$$

Here, $f_{Occ}(r_{Occ})$ is a monotonic non-increasing function having a range of [0, 1], and is expressed as, for example, FIG. 17A. This function is used as $f_{Occ}(r_{Occ})$ to calculate, for example, the relation between the occlusion degree and the matching accuracy.

Figure 18:
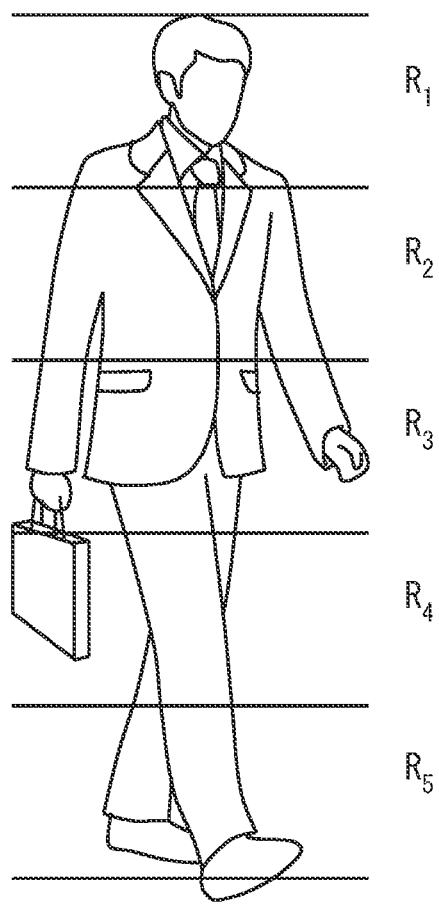
FIG. 18 is a diagram showing a division example of a person region when an object is a person.

Note that, to obtain the occlusion degree, instead of directly using the occlusion rate of the entire object region, the occlusion degree may be calculated in consideration of which part of the object region is occluded. For example, if the object is a person, influence on the matching accuracy is small when the region close to the feet is slightly occluded, but the influence on the matching accuracy can be large when the region close to the head is occluded. In this manner, when the degree of influence on matching is different depending on the occluded part, the occlusion rate is calculated for each part, and then the occlusion degree is calculated by weighting and adding it. For example, if the object is a person, the person is divided into a plurality of regions $R_1, R_2, \ldots, R_M$ (equivalent to M=5 in FIG. 18) in a vertical direction by horizontal lines as shown in FIG. 18. Then, the occlusion rate is calculated for each region, and the occlusion degree is calculated by performing weighting and adding as shown in Expression (18).

[Expression 18]

$$r_{Occ} = \sum_{m=1}^{M} w_m r_m \qquad (18)$$

Here, $r_m$ and $w_m$ are respectively the occlusion rate and the weight coefficient for a region $R_m$. The weight coefficient is a coefficient that has a larger value as a region has larger influence on matching, and is assumed to be normalized in such a manner that the total sum is 1. By using a occluson degree calculated by weighting each part of the object in this manner, the quality index based on the occlusion degree is calculated.

Then, other quality indexes for resolution, motion, and posture/orientation are calculated as described above, and a function $g_3$ representing the relation between the quality index for each factor and a total quality index Q is defined as in Expression (19) and used.

[Expression 19]

$$Q = g_3(q_{Occ}, q_{Res}, q_{Mot}, q_{Pos}) \qquad (19)$$

As the function of Expression (19), a function shown in Expression (20) can be used, for example.

[Expression 20]

$$g_3(q_{Occ}, q_{Res}, q_{Mot}, q_{Pos}) = q_{Occ} q_{Res} q_{Mot} q_{Pos} \qquad (20)$$

In addition, when the quality index based on an environmental factor is also used, a function $g_4$ representing the relation between the quality index for each factor and the total quality index Q is defined as in Expression (21) and used.

[Expression 21]

$$Q = g_4(q_{Occ}, q_{Res}, q_{Mot}, q_{Pos}, q_{Env}) \qquad (21)$$

As the function of Expression (21), a function shown as in Expression (22) can be used, for example.

[Expression 22]

$$g_4(q_{Occ}, q_{Res}, q_{Mot}, q_{Pos}, q_{Env}) = q_{Env} g_3(q_{Occ}, q_{Res}, q_{Mot}, q_{Pos}) \qquad (22)$$

With the above, it is possible to predict deterioration of the quality of a feature due to occlusion between objects, and to select an object to be subjected to feature extraction.

Figure 11:
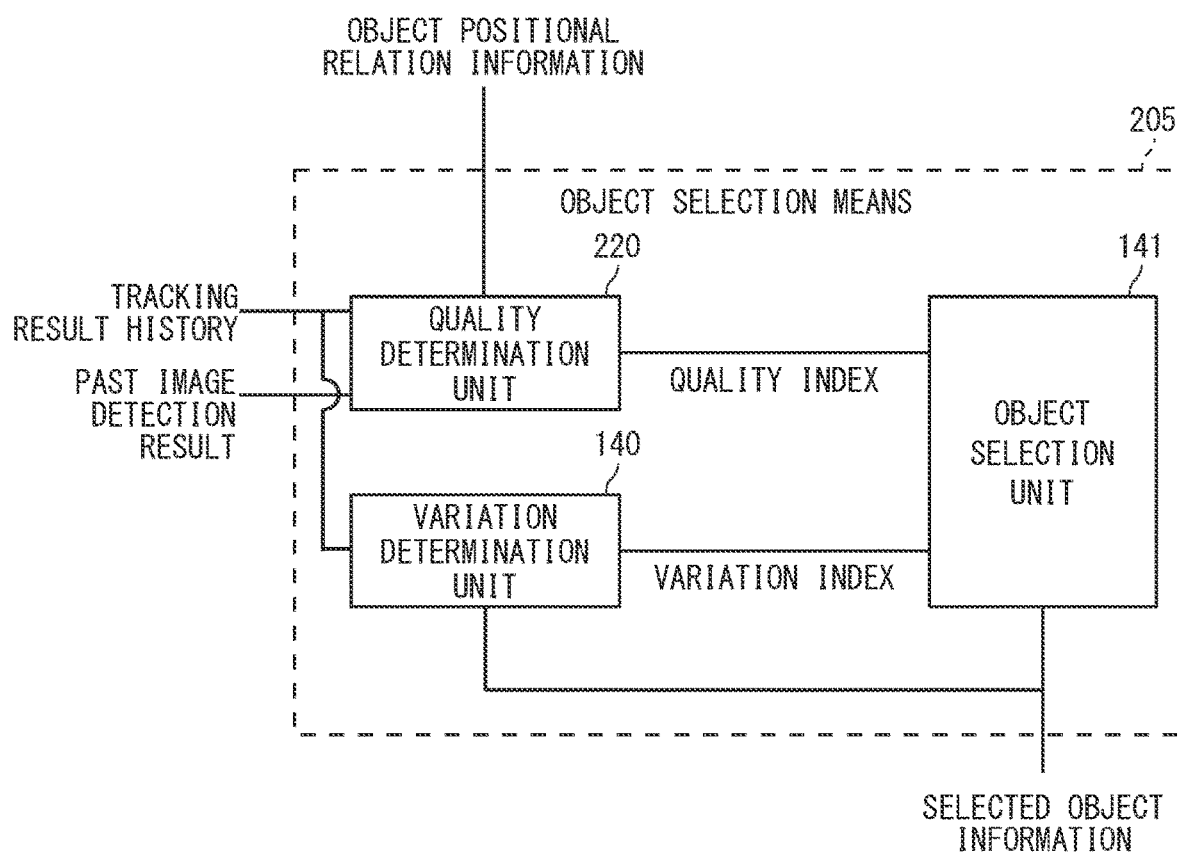
FIG. 11 is a block diagram exemplifying a configuration of another object selection means in the object feature extraction device according to the second example embodiment.

Next, another example embodiment of the object selection means 205 in FIG. 9 is described. FIG. 11 is a block diagram exemplifying another object selection means in the object feature extraction device according to the second example embodiment.

As shown in FIG. 11, another object selection means 205 includes a quality determination unit 220, a variation determination unit 140, and an object selection unit 141.

As compared to the object selection means 105 in FIG. 5, the object selection means 205 is similar to the object selection means 105 except that the quality determination unit 220 is provided instead of the quality determination unit 120.

Next, the operation of the object selection means 205 in FIG. 11 is described. The operation of the quality determination unit 220 is similar to the quality determination unit 220 in FIG. 10. In addition, the operation of the variation determination unit 140 and the object selection unit 141 is similar to that in FIG. 5.

In this manner, it is possible to select an object in consideration of both the quality index and the variation index. It is needless to say that, as described in the first example embodiment, objects may be collectively selected for a plurality of frames in the second example embodiment.

(Third Example Embodiment)

Figure 12:
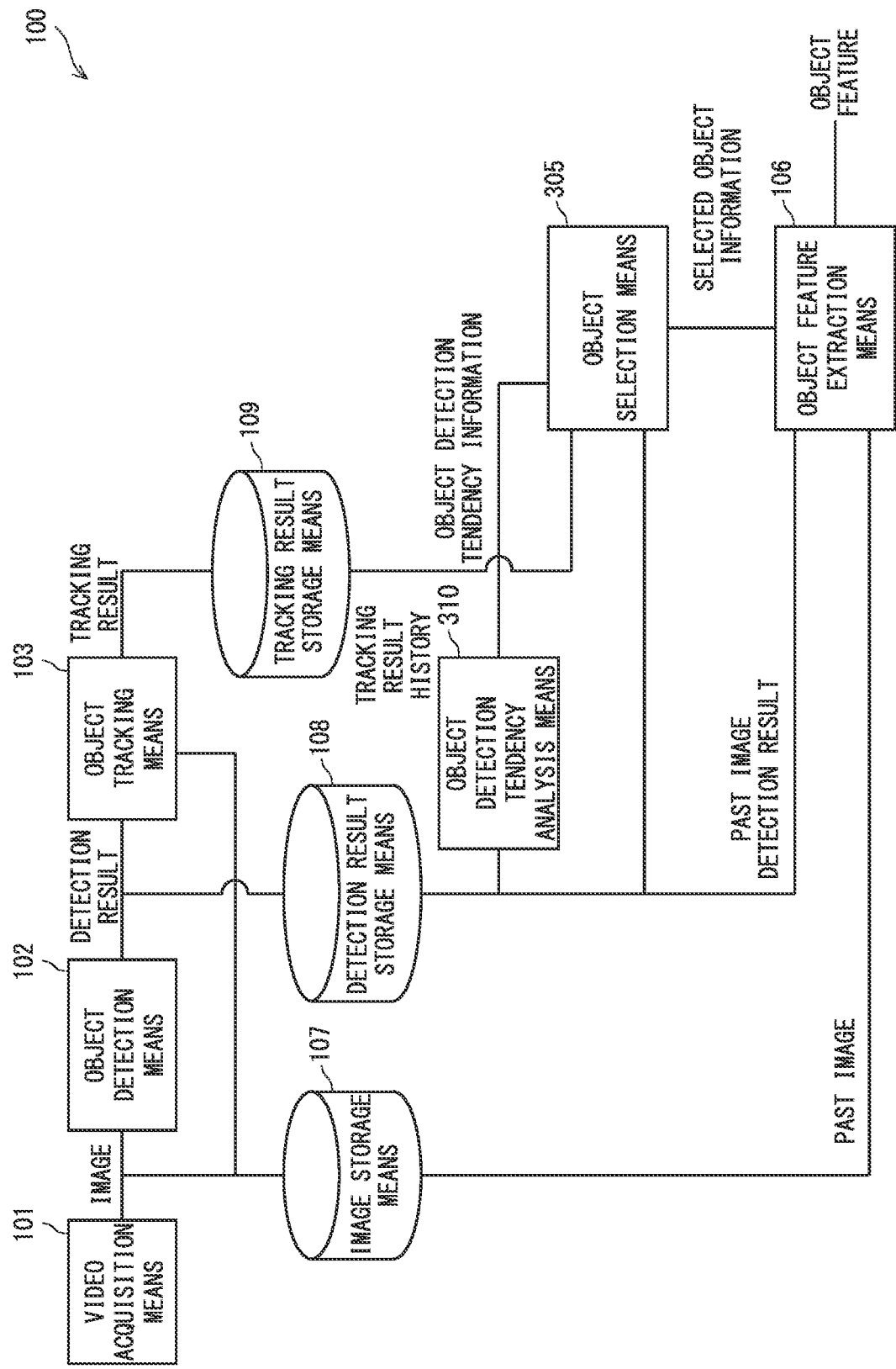
FIG. 12 is a block diagram exemplifying a configuration of an object feature extraction device according to a third example embodiment.

Next, a third example embodiment of the present invention will be described. FIG. 12 is a block diagram exemplifying a configuration of an object feature extraction device according to the third example embodiment. As shown in FIG. 12, an object feature extraction device 100 according to the third example embodiment is different from the object feature extraction device 100 in FIG. 1 in that an object detection tendency analysis means 310 is newly added and that an object selection means 305 is provided instead of the object selection means 105, as compared to the object feature extraction device 100 in FIG. 1.

The connection relation among a video acquisition means 101, an object detection means 102, an object tracking means 103, an image storage means 107, and a tracking result storage means 109 is similar to that in FIG. 1. A detection result storage means 108 is also similar, but its output is also connected to the object detection tendency analysis means 310.

The object detection tendency analysis means 310 analyzes, based on a past image tracking result output from the detection result storage means 108, the detection tendency of an object, and outputs object detection tendency information to the object selection means 305. The object selection means 305 selects objects to be subjected to feature extraction based on the past image tracking result output from the detection result storage means 108, tracking result history information output from the tracking result storage means 109, and the object detection tendency information output from the object detection tendency analysis means 310, and outputs selected object information to the object feature extraction means 106. The object feature extraction means 106 extracts, from the image output from the image storage means 107 based on an object detection result output from the detection result storage means 108, a feature of the object included in the selected object information output from the object selection means 305.

Next, the operation of the object feature extraction device 100 in FIG. 12 is described. The operation of the video acquisition means 101, the object detection means 102, the object tracking means 103, the image storage means 107, the detection result storage means 108, and the tracking result storage means 109 is similar to that in FIG. 1.

The object detection tendency analysis means 310 analyzes input object detection result information and obtains the object detection tendency for each location in the image. At the location where there is an obstacle such as a shelf, an object is occluded and is not detected in many cases. If an entire object is occluded, the object is not detected completely, but if a part of the object is occluded, the object can or cannot be detected. For this reason, if the number of object detections during a certain period of time is tallied for each location, the detection frequency is higher at the location where there is no obstacle, but the detection frequency becomes lower at the location where an object is occluded by an obstacle or the like. Such frequency information for each location is generated as object detection tendency information.

Alternatively, if the object detection means 102 is a means for detecting a plurality of parts of an object, the number of detections of the parts during a certain period of time may be tallied for each location. At this time, the tendency of simultaneous detection, such as whether a plurality of parts has been simultaneously detected, may be tallied for each location and included in the object detection tendency information.

For example, if the object is a person, and the object detection means 102 is a detection means for simultaneously detecting the head and the body of a person, the detection frequency for each of the head and the body is tallied for each location. At the same time, the number of detections in which both the head and the body are simultaneously detected are also tallied for each location. The tendency of simultaneous detection can be used to grasp the tendency of partial occlusion at that location. In the example of simultaneously detecting the head and the body, if the head is detect but the body is not detected in many cases, it is assumed that there is a person but that the body is not detect. This can be said to indicate, at that location, that the region below the head in the body region is highly likely occluded. In this manner, by analyzing the detection results of a plurality of parts together, it is possible to more detailedly grasp the tendency of object occlusion for each location.

The object detection tendency information generated in this manner is output to the object selection means 305.

The object selection means 305 further generates, in addition to the operation of the object selection means 105 in FIG. 1, selected object information using the object detection tendency information. The details of the object selection means 305 will be described later. The generated selected object information is output to the object feature extraction means 106. The operation of the object feature extraction means 106 is similar to that in FIG. 1, and the object feature is extracted and output.

With the above, it is possible to automatically determine, from the detection result of an object, the degree of occlusion of the object depending on the location, and to use it to select an object whose feature to be extracted.

Figure 13:
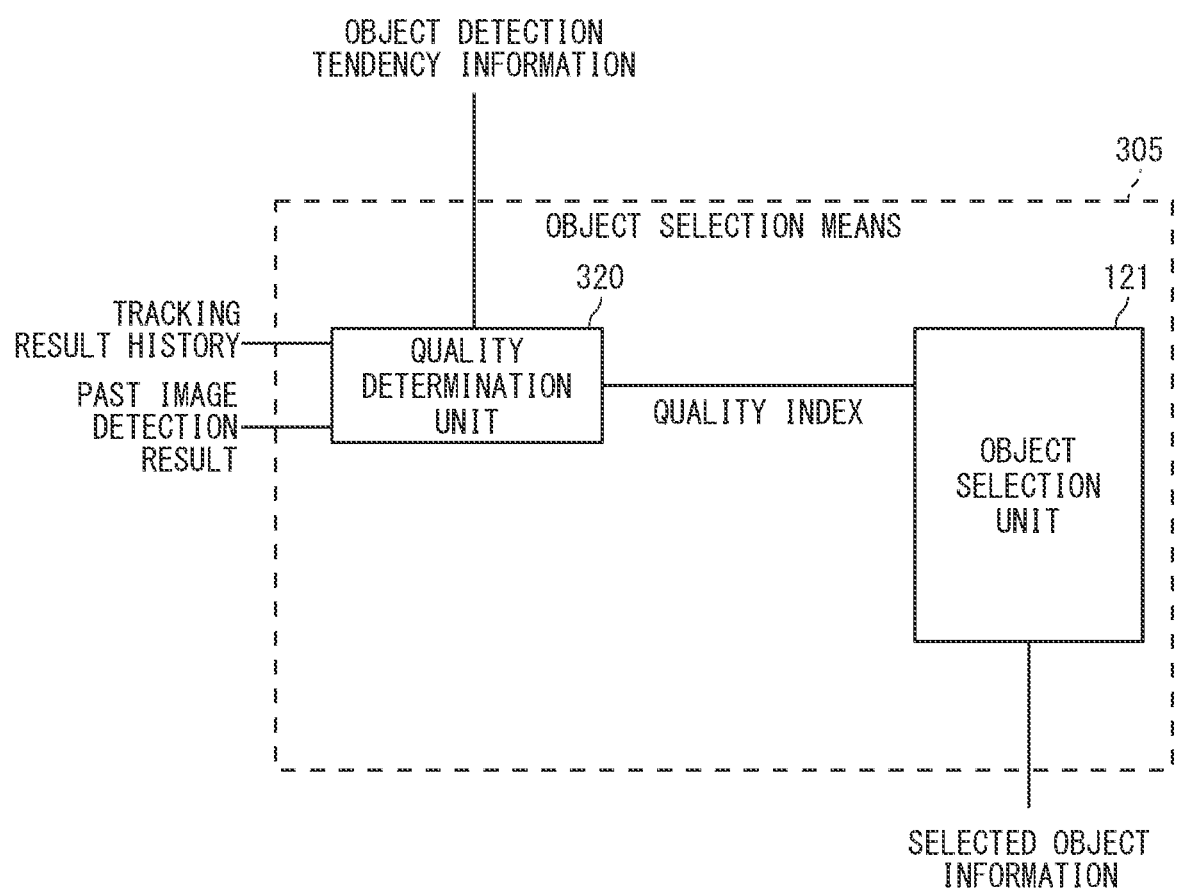
FIG. 13 is a block diagram exemplifying a configuration of an object selection means in the object feature extraction device according to the third example embodiment.

Next, an example embodiment of the object selection means 305 is described. FIG. 13 is a block diagram exemplifying a configuration of an object selection means in the object feature extraction device according to the third example embodiment. As shown in FIG. 13, the object selection means 305 includes a quality determination unit 320 and an object selection unit 121.

The quality determination unit 320 obtains a quality index based on the input object tracking result history, the past image object detection result, and the object detection tendency information, and outputs it to the object selection unit 121. The object selection unit 121 selects, based on the quality index output from the quality determination unit 320, an object whose feature is to be extracted and outputs selected object information.

Next, the operation of the object selection means 305 is described. To the quality determination unit 320, in addition to the past image object detection result and the object tracking result history, the object detection tendency information is input. The operation for calculating the quality index from the past image object detection result and the object tracking result history is similar to that of the quality determination unit 120 in FIG. 2. The quality determination unit 320 further uses the object detection tendency information.

As described above, from the object detection tendency information indicating the frequency of the detection result for each location, the state of the object occluded by an obstacle can be grasped. Thus, assuming that object detection frequency at a location (x, y) is $F_{req}(x, y)$, the quality index obtained from the past image object detection result and the object tracking result history is multiplied by a multiplier β obtained by Expression (23) to calculate a final quality index.

[Expression 23]

$$\beta = q_{Loc}(\text{Freq}(x,y)) \quad (23)$$

Here, a function $q_{Loc}$ is a monotonic non-decreasing function for the frequency $F_{req}(x, y)$. If the frequency of simultaneous detection of a plurality of parts is included, the rate obtained by dividing the frequency of simultaneous detection by the frequency of the part that has been detected most may be used instead of the detection frequency. The obtained quality index is output to the object selection unit 121.

The operation of the object selection unit 121 is similar to that in FIG. 2, and the selected object information is generated and output.

With the above, it is possible to automatically determine the tendency of occurring object occlusion depending on the location, and to reflect it in the quality index.

Figure 14:
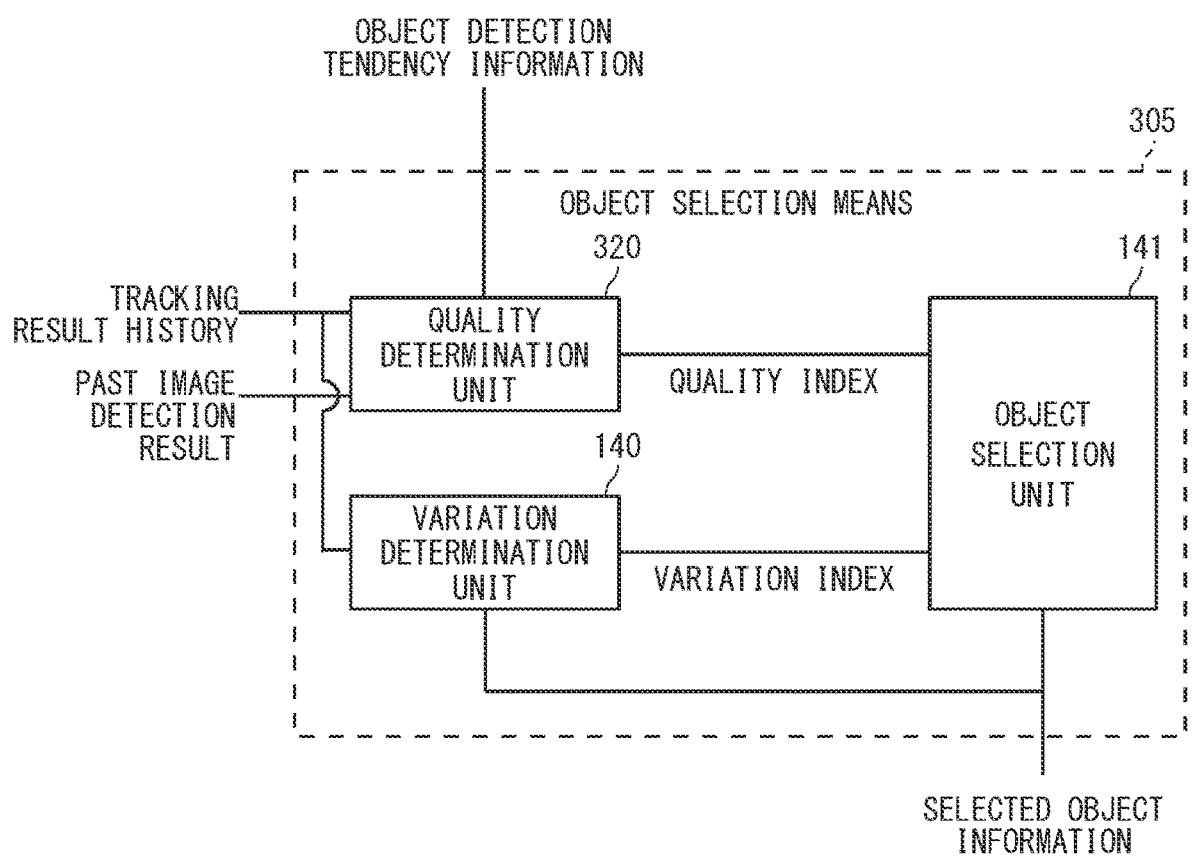
FIG. 14 is a block diagram exemplifying a configuration another object selection means in the object feature extraction device according to the third example embodiment.

Next, another example embodiment of the object selection means 305 is described. FIG. 14 is a block diagram exemplifying a configuration of another object selection means in the object feature extraction device according to the third example embodiment. As shown in FIG. 14, another object selection means 305 includes a quality determination unit 320, a variation determination unit 140, and an object selection unit 141.

The object selection means 305 has similar connection relation to the object selection means 105 in FIG. 5 except that the quality determination unit 320 is provided instead of the quality determination unit 120, as compared to the object selection means 105 in FIG. 5.

Next, the operation of the object selection means 305 in FIG. 14 is described. The operation of the quality determination unit 320 is similar to that in FIG. 13, and the quality index is output to the object selection unit 141. The operation of the variation determination unit 140 and the object selection unit 141 is similar to that of the object selection means 105 in FIG. 5.

With the above, it is possible to automatically determine the tendency of occurring object occlusion depending on the location, to reflect it in the quality index, and to select an object in consideration of the variation index. It is needless to say that, as described in the first example embodiment, objects may be collectively selected for a plurality of frames in the third example embodiment.

(Fourth Example Embodiment)

Figure 15:
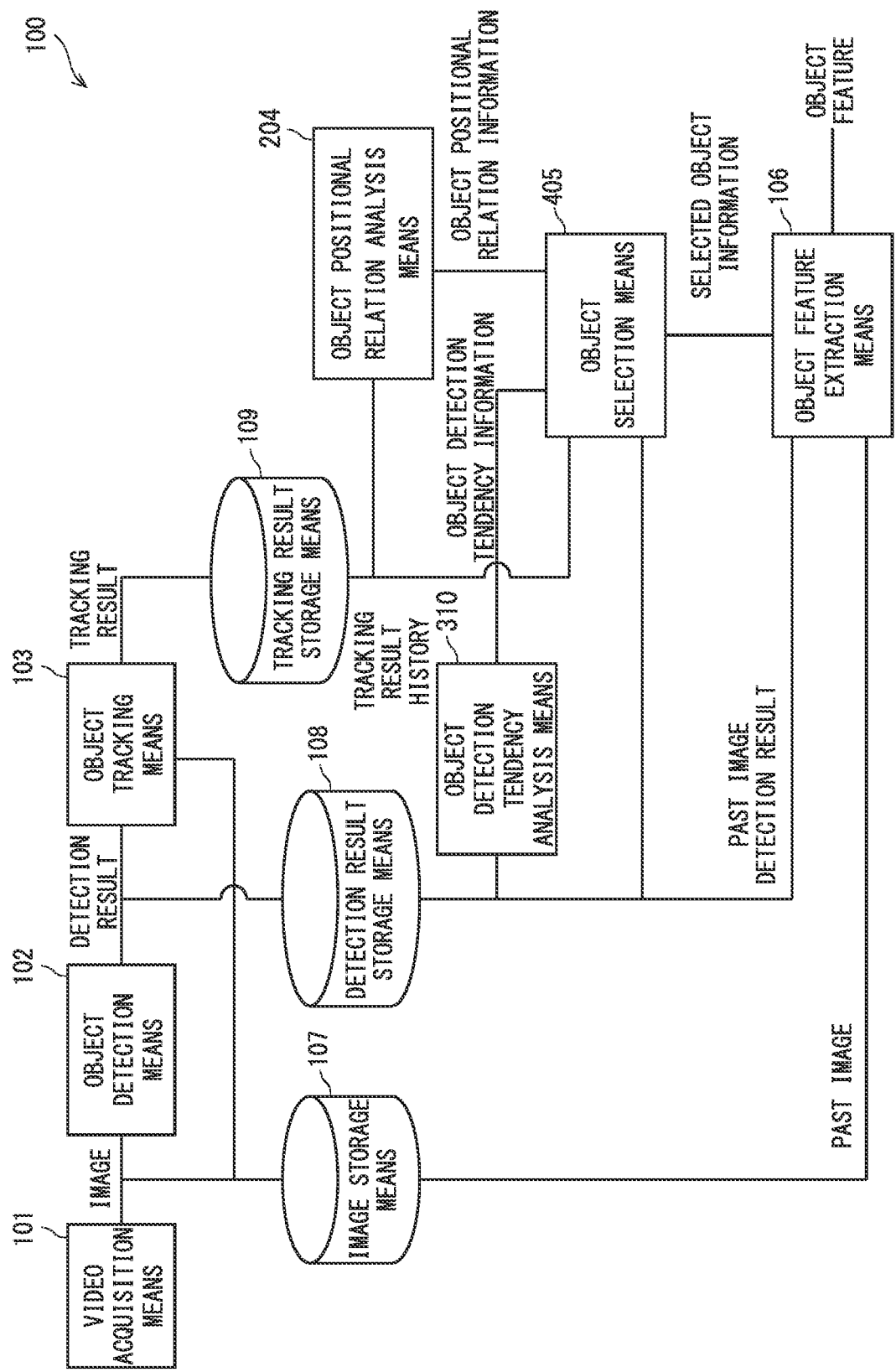
FIG. 15 is a block diagram exemplifying a configuration of an object feature extraction device according to a fourth example embodiment.

Next, a fourth example embodiment of the present invention is described. FIG. 15 is a block diagram exemplifying a configuration of an object feature extraction device according to the fourth example embodiment. As shown in FIG. 15, an object feature extraction device 100 according to the fourth example embodiment is different from the object feature extraction device 100 in FIG. 9 in that an object selection means 405 is provided instead of the object selection means 205 and that an object detection tendency analysis means 310 is added.

The object detection tendency analysis means 310 analyzes, based on a past image object detection result output from a detection result storage means 108, the detection tendency of an object, and outputs object detection tendency information to the object selection means 405. The object selection means 405 selects an object to be subjected to feature extraction based on the past image object detection result output from the detection result storage means 108, an object tracking result history output from a tracking result storage means 109, object positional relation information output from an object positional relation analysis means 204, and the object detection tendency information output from the object detection tendency analysis means 310, and outputs selected object information to an object feature extraction means 106. The other connection relation is similar to that in FIG. 9.

Next, the operation of the object feature extraction device 100 in FIG. 15 is described. The operation of a video acquisition means 101, an object detection means 102, an object tracking means 103, an image storage means 107, the detection result storage means 108, the tracking result storage means 109, the object positional relation analysis means 204 is similar to that in FIG. 9. The operation of the object detection tendency analysis means 310 is also similar to that in FIG. 12.

The object selection means 405 further generates, in addition to the operation of the object selection means 205 in FIG. 9, the selected object information using the object detection tendency information. The details of the object selection means 405 will be described later. The generated selected object information is output to the object feature extraction means 106.

The operation of the object feature extraction means 106 is also similar to that in FIG. 1, and an object feature is extracted and output.

With the above, since an object is selected using, in addition to the object positional relation information, the object detection tendency, it is possible to perform more suitable selection.

Figure 16A:
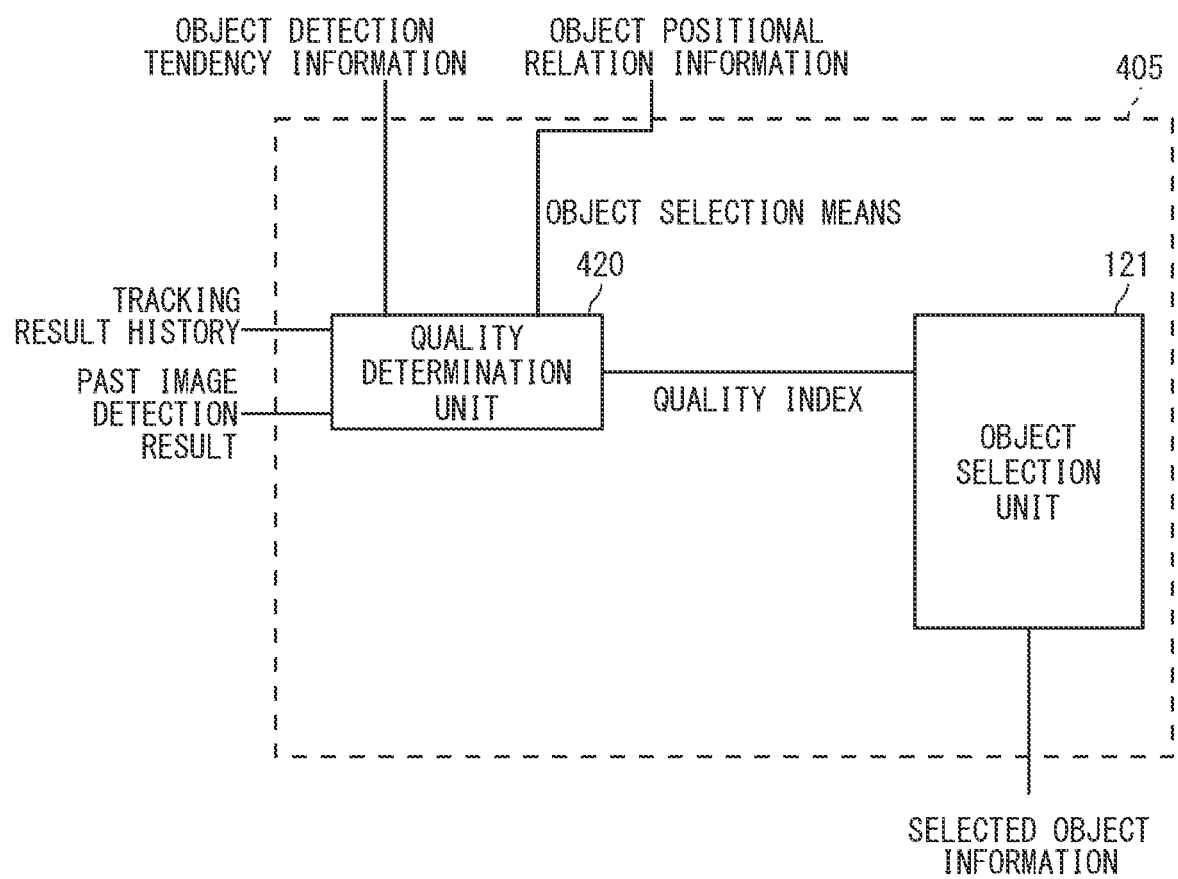
FIG. 16A is a block diagram exemplifying a configuration of an object selection means in the object feature extraction device according to the fourth example embodiment.

Next, an example embodiment of the object selection means 405 is described. FIG. 16A is a block diagram exemplifying a configuration of an object selection means in the object feature extraction device according to the fourth example embodiment. As shown in FIG. 16A, the object selection means 405 includes a quality determination unit 420 and an object selection unit 121.

The object selection means 405 is different from the object selection means 205 in FIG. 10 in that the quality determination unit 420 is provided instead of the quality determination unit 220.

The quality determination unit 420 obtains the quality index based on an input object tracking result history, a past image object detection result, object detection tendency information, and object positional relation information, and outputs it to the object selection unit 121. The object selection unit 121 selects, based on the quality index output from the quality determination unit 420, an object whose feature is to be extracted, and outputs selected object information.

Next, the operation of the object selection means 405 is described. To the quality determination unit 420, the object detection tendency information is input in addition to the past image object detection result, the object tracking result history, and the object positional relation information. The operation for calculating the quality index from the past image object detection result, the object tracking result history, and the object positional relation information is similar to that of the quality determination unit 220 in FIG. 10. The quality determination unit 420 further uses the object detection tendency information.

That is, similarly to the quality determination unit 320 in FIG. 13, a multiplier β expressed by Expression (23) is obtained from the object detection tendency information indicating the frequency of the detection result for each location, and is multiplied by the quality index obtained from the past image object detection result, the object tracking result history, and the object positional relation information to calculate a final quality index. The obtained quality index is output to the object selection unit 121.

The operation of the object selection unit 121 is similar to that in FIG. 10, and the selected object information is generated and output.

With the above, it is possible to reflect not only the object positional relation but also the object detection tendency in the quality index.

Figure 16B:
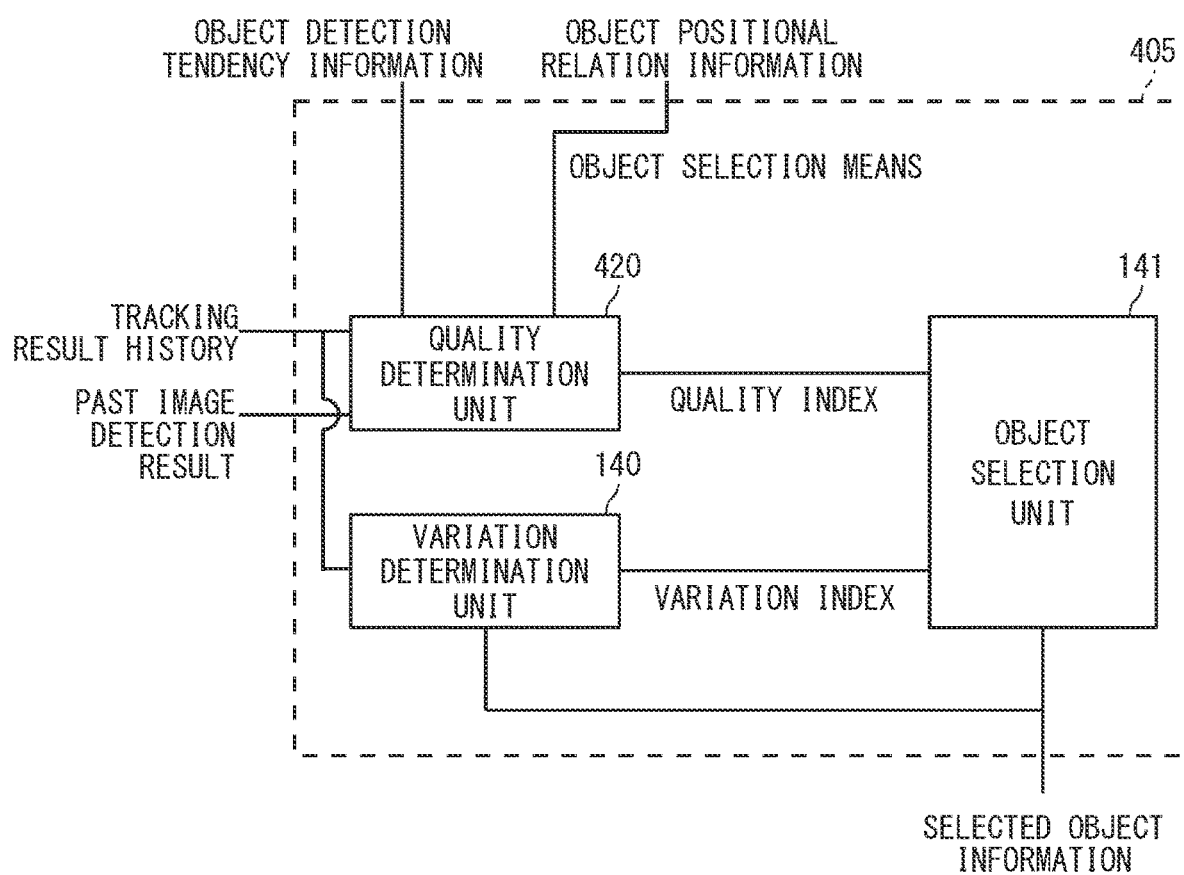
FIG. 16B is a block diagram exemplifying a configuration of another object selection means in the object feature extraction device according to the fourth example embodiment.

Next, another example embodiment of the object selection means 405 is described. FIG. 16B is a block diagram exemplifying a configuration of another object selection means in the object feature extraction device according to the fourth example embodiment. As shown in FIG. 16B, another object selection means 405 includes a quality determination unit 420, a variation determination unit 140, and an object selection unit 141.

The object selection means 405 has similar connection relation to the object selection means 205 in FIG. 11 except that the quality determination unit 420 is provided instead of the quality determination unit 220, as compared to the object selection means 205 in FIG. 11.

Next, the operation of the object selection means 405 in FIG. 16B is described. The operation of the quality determination unit 420 is similar to that in FIG. 16A, and the quality index is output to the object selection unit 141. The operation of the variation determination unit 140 and the object selection unit 141 is similar to that of the object selection means 105 in FIG. 5.

With the above, it is possible reflect not only the object positional relation but also the object detection tendency in the quality index, and to select an object in further consideration of the variation index. It is needless to say that, as described in the first example embodiment, objects may be collectively selected for a plurality of frames in the fourth example embodiment.

<Configuration Example of Hardware 22

Here, a hardware configuration of the object feature extraction device 100 is described below. Each functional component of the object feature extraction device 100 may be implemented by hardware (for example, a hard-wired electronic circuit or the like) performing each functional component, or by combination of hardware and software (for example, combination of an electronic circuit and a program controlling it). In the following, it is further described that each functional component of the object feature extraction device 100 is implemented by combination of hardware and software.

Figure 20:
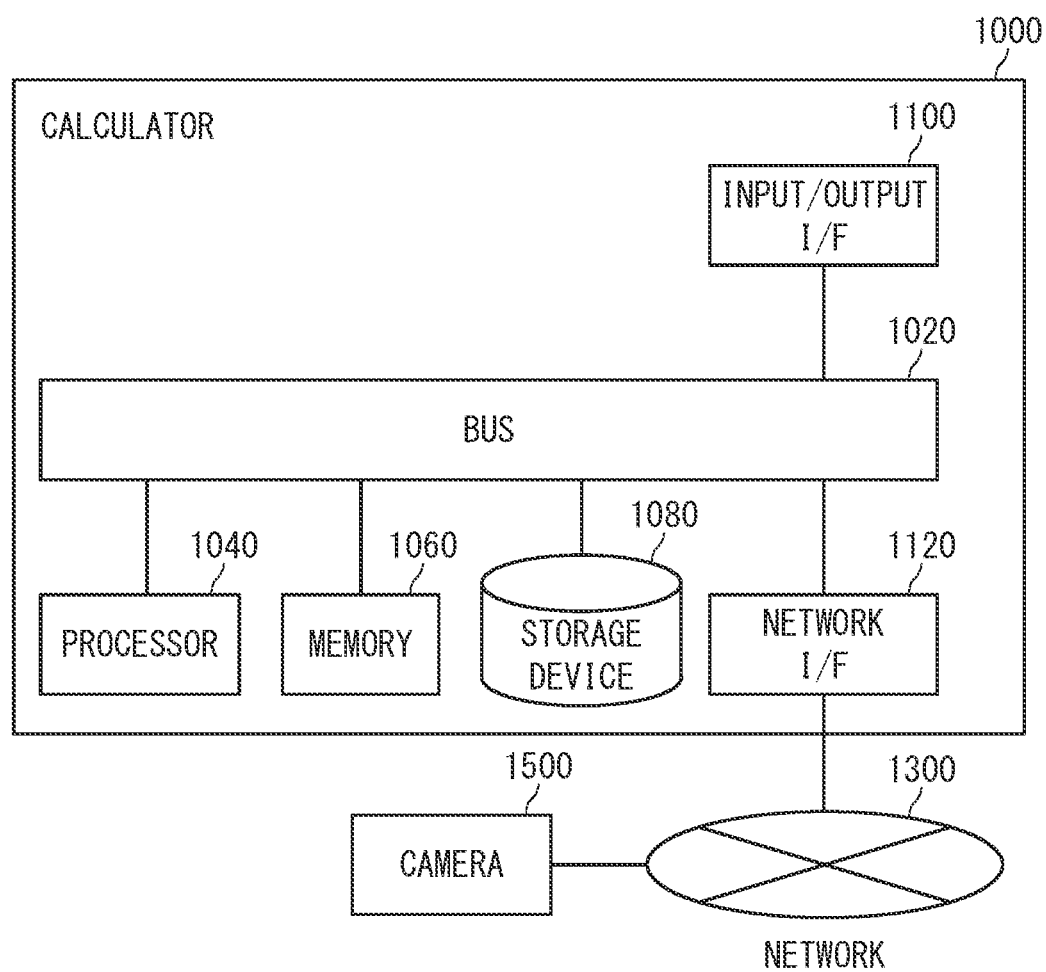
FIG. 20 is a diagram exemplifying a calculator, a network, and a camera for implementing the object feature extraction device according to the first to fourth example embodiments.

FIG. 20 is a diagram exemplifying a calculator, a network, and a camera that implement the object feature extraction device according to the first to fourth example embodiments. A calculator 1000 is an arbitrary calculator. For example, the calculator 1000 is a personal computer (PC), a server machine, a tablet terminal, a smart phone, or the like. The calculator 1000 may be a dedicated calculator designed to implement the object feature extraction device 100, or a general-purpose calculator.

The calculator 1000 includes a bus 1020, a processor 1040, a memory 1060, a storage device 1080, an input/output interface 1100, and a network interface 1120. The bus 1020 is a data transmission line for the processor 1040, the memory 1060, the storage device 1080, the input/output interface 1100, and the network interface 1120 to mutually transmit and receive data. However, the method for connecting the processor 1040 and the like with each other is not limited to bus connection. The processor 1040 is one of various processors such as a central processing unit (CPU), a graphics processing unit (GPU), or a field-programmable gate array (FPGA). The memory 1060 is a main storage device implemented using a random access memory (RAM) or the like. The storage device 1080 is an auxiliary storage device implemented using a hard disk, a solid state drive (SSD), a memory card, or a read only memory (ROM).

The input/output interface 1100 is an interface that connects the calculator 1000 and input/output devices. For example, the input/output interface 1100 is connected to input devices such as a keyboard and the like, and output devices such as a display device and the like.

The network interface 1120 is an interface that connects the calculator 1000 to a network 1300. This network is, for example, a local area network (LAN) or a wide area network (WAN). The method for connecting the network interface 1120 to a network may be wireless connection or wired connection.

In addition, the network 1300 is connected to a camera 1500, and the calculator 1000 and the camera 1500 are capable of communicating data through the network 1300. The camera 1500 corresponds to the video acquisition means 101 of the object feature extraction device 100.

The storage device 1080 stores a program module that implements each means of the object feature extraction device 100. The processor 1040 loads each program module into the memory 1060 and executes it to implement the function corresponding to each program module.

Note that, some functions of the object feature extraction device 100 may be implemented by the camera 1500. That is, a processor, a storage device, and a memory are included inside the camera 1500, and all or a part of processing of each means of the object feature extraction device 100 may be performed by these components. For example, the processing of the video acquisition means 101, the object detection means 102, and the object tracking means 103 is performed by the camera 1500, and other processing may be performed by the calculator 1000. Alternatively, the processing other than the object feature extraction means 106 is performed by the camera, and the processing of the object feature extraction means 106 may be performed by the calculator 1000.

In addition, the video acquisition means 101 may be a video recording device, such as a hard disk recorder, that stores videos captured by the camera. In this case, the video acquisition means 101 acquired a video by reading and reproducing the video stored in the video recording device, and transmits it to the calculator 1000 through the network 1300. Then, the subsequent processing is performed by the calculator 1000.

The present invention has been described above as examples of application to the above exemplary example embodiments. However, the technical scope of the present invention is not limited to the scope described in each example embodiment. It is apparent to those skilled in the art that various modifications or improvements can be made to the example embodiments. In such cases, new example embodiments with such modifications or improvements can be included in the technical scope of the present invention. This is obvious from the description in Claims. A part or all of the above example embodiments may be described as the following Supplementary notes but are not limited to the following.

(Supplementary Note 1)

An object feature extraction device comprising:

a video acquisition means for acquiring a video;

an object detection means for detecting an object from the video and generating a detection result;

an object tracking means for tracking the object based on the video and the detection result and generating a tracking result;

a video storage means for storing the video;

a detection result storage means for storing the detection result;

a tracking result storage means for storing the tracking result;

an object selection means for obtaining, based on the detection result stored in the detection result storage means and the tracking result stored in the tracking result storage means, a quality index for predicting quality of a feature of the object detected at an extraction time, the extraction time being one or more frames before a current time, selecting, based on the quality index, the object to be subjected to feature extraction at the extraction time, and generating object selection information; and an object feature extraction means for extracting the feature of the object detected from a frame at the extraction time, based on the video at the extraction time stored in the video storage means, the detection result at the extraction time stored in the detection result storage means, and the object selection information.

(Supplementary Note 2)

The object feature extraction device according to Supplementary note 1, wherein the object selection means calculates the quality index based on at least one of resolution of the object determined using the detection result, a motion amount of the object determined using the tracking result, and a posture or orientation of the object, and calculates a total quality index based on them.

(Supplementary Note 3)

The object feature extraction device according to Supplementary note 1 or 2, wherein the object selection means stores the quality index based on an environmental factor determined depending on a position of the object, obtains, based on position information about the object obtained from the tracking result, the quality index based on the environmental factor, and calculates the total quality index also using an obtained value.

(Supplementary Note 4)

The object feature extraction device according to any one of Supplementary notes 1 to 3, wherein the object selection means also obtains, in addition to the quality index, a variation index for predicting a degree of variation improvement of an acquired feature, selects, based on both the quality index and the variation index, the object to be subjected to feature extraction, and generates the object selection information.

(Supplementary Note 5)

The object feature extraction device according to Supplementary note 4, wherein the variation index is determined based on an elapsed time from a last feature extraction, and is a value that becomes larger as the elapsed time becomes larger.

(Supplementary Note 6)

The object feature extraction device according to Supplementary note 4, wherein the variation index is determined based on an elapsed time from a last feature extraction and the number of feature extractions up to that time point, and is a value that becomes larger as the elapsed time becomes larger and as the number of feature extractions becomes fewer.

(Supplementary Note 7)

The object feature extraction device according to any one of Supplementary notes 4 to 6, wherein the variation index is determined also using a movement amount of the object determined based on the tracking result, and is a value that becomes larger as the movement amount becomes larger.

(Supplementary Note 8)

The object feature extraction device according to any one of Supplementary notes 4 to 7, wherein the variation index is a value determined in consideration of a category determined depending on a state of the object, and the category is determined based on the tracking result to obtain the variation index.

(Supplementary Note 9)

The object feature extraction device according to any one of Supplementary notes 4 to 8, wherein the variation index is determined also using information indicating tendency of state change of the object depending on a position of the object.

(Supplementary Note 10)

The object feature extraction device according to any one of Supplementary notes 1 to 9, further comprises an object positional relation analysis means for analyzing, based on the tracking result stored in the tracking result storage means, positional relation of the object and generating object positional relation information, wherein the object selection means calculates the quality index also using the object positional relation information.

(Supplementary Note 11)

The object feature extraction device according to Supplementary note 10, wherein the object selection means obtains, from the object positional relation information, a occlusion degree indicating a degree to which the object is occluded by another object, calculates the quality index by a monotonic non-increasing function of the occlusion degree, and calculates a total quality index using an obtained value.

(Supplementary Note 12)

The object feature extraction device according to any one of Supplementary notes 1 to 11, further comprises an object detection tendency analysis means for analyzing, based on the detection result stored in the detection result storage means, tendency of object detection for each location and generating object detection tendency information, wherein the object selection means calculates the quality index also using the object detection tendency information.

(Supplementary Note 13)

The object feature extraction device according to any one of Supplementary notes 1 to 12, wherein the object selection means obtains quality indexes for predicting quality of features of objects detected at a plurality of extraction times, the extraction times being one or more frames before the current time, collectively selecting, based on the quality indexes, objects to be subjected to feature extractions at the plurality of extraction times, and generates object selection information, and the object feature extraction means extracts the features of the objects selected for the plurality of extraction times.

(Supplementary Note 14)

The object feature extraction device according to Supplementary note 13, wherein the number of times included in the plurality of extraction times changes dynamically depending on the number of detected objects.

(Supplementary Note 15)

The object feature extraction device according to Supplementary note 13 or 14, wherein the number of objects to be selected when object selection for the plurality of extraction times is performed is controlled in such a manner that a target number of the object selection is a number obtained by multiplying the predetermined average number of objects to be selected by the number of the extraction times and that the number of objects to be selected is equal to or less than the target number.

(Supplementary Note 16)

The object feature extraction device according to Supplementary note 13 or 14, wherein when, in the control, the number of selected objects is less than a target number, the target number for next object selection is set by adding a difference between the target number and the number of selected objects.

REFERENCE SIGNS LIST

100 Object feature extraction device
101 Video acquisition means
102 Object detection means
103 Object tracking means
105 Object selection means
106 Object feature extraction means
107 Image storage means
108 Detection result storage means
109 Tracking result storage means
120 Quality determination unit
121 Object selection unit
130 Quality index calculation unit
131 Quality index calculation unit
132 Environmental factor storage unit
140 Variation determination unit
141 Object selection unit
150 Variation index calculation unit
151 Extraction history storage unit
154 Object state change tendency storage unit
155 Variation index calculation unit
204 Object positional relation analysis means
205 Object selection means
220 Quality determination unit
305 Object selection means
310 Object detection tendency analysis means
320 Quality determination unit
405 Object selection means
420 Quality determination unit

What is claimed is:

1. An object feature extraction device for analyzing at least one video, the object feature extraction device comprising:
at least one processor; and
at least one memory storing instructions executable by the at least one processor to:
generate frame images from the at least one video;
detect an object from the frame images, yielding in a detection result;
track the object based on the frame images and the detection result, yielding a tracking result;
store the frame images, the detection result, and the tracking result;
calculate, based on the detection result and the tracking result, a quality index for predicting quality of a feature of the object detected at an extraction time before a current time;
calculate a variation index for predicting a degree of variation improvement of the feature;
select, based on both the quality index and the variation index, the object to be subjected to feature extraction at the extraction time, yielding object selection information; and
extract the feature of the object detected from the frame images at the extraction time, based on the frame images at the extraction time, the detection result at the extraction time, and the object selection information.

2. The object feature extraction device according to claim 1,
the quality index is calculated based on of at least one of a resolution of the object determined using the detection result, a motion amount of the object determined using the tracking result, a posture of the object, and an orientation of the object, and
the instructions are executable by the at least one processor to further calculate a total quality index based on the calculated quality index.

3. The object feature extraction device according to claim 2, wherein the instructions are executable by the at least one processor to further:
stores the quality index based on an environmental factor determined depending on a position of the object, and
the quality index based on the environment factor is calculated based on position information about the object obtained from the tracking result.

4. The object feature extraction device according to claim 1, wherein the variation index is determined based on an elapsed time from a last feature extraction, and is a value that becomes larger as the elapsed time becomes larger.

5. The object feature extraction device according to claim 1, wherein the variation index is determined based on an elapsed time from a last feature extraction and a number of feature extractions up to that time point, and is a value that becomes larger as the elapsed time becomes larger or as the number of feature extractions becomes fewer.

6. The object feature extraction device according to claim 1, wherein the variation index is determined al-se using a movement amount of the object determined based on the tracking result, and is a value that becomes larger as the movement amount becomes larger.

7. The object feature extraction device according to claim 1, wherein
the variation index is a value determined in consideration of a category determined depending on a state of the object, and
the category is determined based on the tracking result to calculate the variation index.

8. An object feature extraction method for analyzing at least one video, the object feature extraction method comprising:
generating, by the processor, frame images from the at least one video;
detecting, by the processor, an object from the frame images, yielding a detection result;
tracking, by the processor, the object based on the frame image and the detection result, yielding a tracking result;

storing, by the processor, the frame images, the detection result, and the tracking result;

calculating, by the processor, based on the detection result and the tracking result, a quality index for predicting quality of a feature of the object detected at an extraction time before a current time;

calculating, by the processor, a variation index for predicting a degree of variation improvement of the feature;

selecting, by the processor and based on both the quality index and the variation index, the object to be subjected to feature extraction at the extraction time, yielding object selection information; and extracting, by the processor and based on the frame images at the extraction time, the detection result at the extraction time, and the object selection information.

9. A non-transitory computer-readable medium storing a program for analyzing at least one video, the program when executed by a computer causing the computer to perform:

generating frame images from the at least one video;

detecting an object from the frame images, yielding a detection result;

tracking the object based on the frame image and the detection result, yielding a tracking result;

storing the frame images, the detection result, and the tracking result;

calculating, based on the detection result and the tracking result, a quality index for predicting quality of a feature of the object detected at an extraction time before a current time;

calculating a variation index for predicting a degree of variation improvement of the feature;

selecting, based on both the quality index and the variation index, the object to be subjected to feature extraction at the extraction time, yielding object selection information; and extracting, based on the frame images at the extraction time, the detection result at the extraction time, and the object selection information.

10. The object feature extraction device according to claim 1, wherein the variation index is determined using information indicating tendency of state change of the object depending on a position of the object.

11. The object feature extraction device according to claim 1, wherein the instructions are executable by the at least one processor to further:

analyze, based on the tracking result, a positional relation of the object, yielding object positional relation information, and the quality index is calculated using the object positional relation information.

12. The object feature extraction device according to claim 11, wherein the instructions are executable by the at least one processor to further:

obtain, from the object positional relation information, a occlusion degree indicating a degree to which the object is occluded by another object, calculate the quality index is calculated by a monotonic non-increasing function of the occlusion degree, and calculate a total quality index is calculated by using the calculated quality index.

13. The object feature extraction device according to claim 1, wherein the instructions are executable by the at least one processor to further:

analyze, based on the detection result, a tendency of object detection for each of a plurality of locations, yielding object detection tendency information, and the quality index is calculated by using the object detection tendency information.

14. The object feature extraction device according to claim 1, wherein the instructions are executable by the at least one processor to further:

obtain quality indices for predicting qualities of features of objects detected at a plurality of extraction times before the current time;

generate object selection information by collectively selecting, based on the quality indices, objects to be subjected to feature extractions at the plurality of extraction times; and extract the features of the objects selected for the plurality of extraction time.

15. The object feature extraction device according to claim 14, wherein a number of times included in the plurality of extraction times changes dynamically depending on a number of detected objects.

16. The object feature extraction device according to claim 14, wherein a number of objects to be selected when object selection for the plurality of extraction times is performed is controlled in such a manner that a target number of the object selection is obtained by multiplying a predetermined average number of predetermined average objects to be selected by a number of the extraction times and that the number of objects to be selected is equal to or less than the target number.

17. The object feature extraction device according to claim 14, wherein when a number of selected objects is less than the target number, the target number for a next object selection is set by adding a difference between the target number and the number of selected objects.

* * * * *